(12) United States Patent
Daute

(10) Patent No.: US 8,819,695 B2
(45) Date of Patent: Aug. 26, 2014

(54) CONTROLLING APPLICATION LANDSCAPES

(75) Inventor: Oliver Daute, Duesseldorf (DE)

(73) Assignee: SAP AG, Walldorf (DE)

( * ) Notice: Subject to any disclaimer, the term of this patent is extended or adjusted under 35 U.S.C. 154(b) by 226 days.

(21) Appl. No.: 13/360,290

(22) Filed: Jan. 27, 2012

(65) Prior Publication Data

US 2012/0331120 A1 Dec. 27, 2012

(30) Foreign Application Priority Data

Feb. 22, 2011 (EP) .................................. 11001477

(51) Int. Cl.
G06F 9/46 (2006.01)
G06F 9/445 (2006.01)
G06Q 90/00 (2006.01)
G06F 9/44 (2006.01)

(52) U.S. Cl.
CPC *G06F 8/71* (2013.01); *G06F 9/445* (2013.01); *G06Q 90/00* (2013.01)
USPC ............ 718/106; 719/315; 719/316; 719/332

(58) Field of Classification Search
USPC ................ 705/7.12, 7.26; 718/100–102, 106; 719/315, 316, 318, 332
See application file for complete search history.

(56) References Cited

U.S. PATENT DOCUMENTS

| | | | | |
|---|---|---|---|---|
| 7,415,704 B2* | 8/2008 | Schmidt et al. | ............... | 717/166 |
| 7,539,645 B2* | 5/2009 | Gutbrod et al. | ................. | 705/40 |
| 7,788,300 B2* | 8/2010 | Kuck et al. | ..................... | 707/813 |
| 7,788,319 B2* | 8/2010 | Schmidt et al. | ............... | 709/203 |
| 7,823,130 B2* | 10/2010 | Moser et al. | .................... | 717/124 |
| 7,904,493 B2* | 3/2011 | Schmelter et al. | ............ | 707/820 |
| 7,996,633 B2* | 8/2011 | Zimmerer et al. | ............. | 711/156 |
| 8,146,103 B2* | 3/2012 | Schmidt et al. | ............... | 719/318 |
| 8,286,181 B2* | 10/2012 | Daute | ........................... | 718/106 |
| 8,316,373 B2* | 11/2012 | Cheng et al. | .................. | 718/104 |
| 8,336,033 B2* | 12/2012 | Schmelter et al. | ............ | 717/131 |
| 8,689,179 B2* | 4/2014 | Remmel et al. | ............... | 717/110 |
| 2004/0006585 A1* | 1/2004 | Paulus et al. | .................. | 709/200 |
| 2004/0254945 A1* | 12/2004 | Schmidt et al. | ............... | 707/100 |
| 2008/0126765 A1* | 5/2008 | Moser et al. | .................... | 712/226 |
| 2009/0070784 A1* | 3/2009 | Schmidt et al. | ............... | 719/318 |
| 2009/0192839 A1* | 7/2009 | Ramamoorthy et al. | ......... | 705/7 |
| 2011/0029986 A1* | 2/2011 | Daute | ........................... | 718/108 |
| 2011/0119675 A1* | 5/2011 | Cheng et al. | .................. | 718/104 |

OTHER PUBLICATIONS

Grabski, Bastian, Sebastian Günther, Sebastian Herden, Lars Krüger, Claus Rautenstrauch, and André Zwanziger. "Very large business applications."Informatik-Spektrum 30, No. 4 (2007): 259-263.*

(Continued)

*Primary Examiner* — Jimmy H Tran
(74) *Attorney, Agent, or Firm* — Schwegman, Lundberg & Woessner, P.A.

(57) ABSTRACT

Various embodiments are directed to computer networks, computer systems, computer-implemented methods, and computer program products for controlling application landscapes. The computer network may comprise an application landscape comprising a plurality of components and at least one sequence of processes which can run in the application landscape and a central control unit comprising a central control mechanism and a repository, wherein the central control unit is operable to control the application landscape and wherein the central control mechanism comprises an activation mechanism operable to check in the sequence of processes for activation in the application landscape.

20 Claims, 13 Drawing Sheets

(56) References Cited

OTHER PUBLICATIONS

Günther, Sebastian, and Thorsten Berger. "Service-Oriented Product Lines: Towrads a Development Process and Feature Management Model for Web Services." In SPLC (2), pp. 131-136. 2008.*

Winter, Markus. "Data center consolidation: A step towards infrastructure clouds." in Cloud Computing, pp. 190-199. Springer Berlin Heidelberg, 2009.*

European Application Serial No. 11001477.6, Extended European Search Report and Opinion mailed Feb. 2, 2012, 16 pgs.

Daute, Oliver, et al., "Activity Control in Application Landscapes: A Further Approach to Improving Maintainability of Distributed Application Landscapes", Lecture Notes of the Institute for Computer Sciences, Social Informatics and Telecommunications Engineering, 1, vol. 34, Cloud Computing, 3,, (2010), 83-92.

* cited by examiner

CONTROLLING APPLICATION LANDSCAPES

PRIORITY CLAIM

This application is related to and claims priority to European Patent Application No. 11001477.6 filed Feb. 22, 2011, entitled "COMPUTER NETWORK, COMPUTER SYSTEM, COMPUTER-IMPLEMENTED METHOD, AND COMPUTER PROGRAM PRODUCT FOR CONTROLLING APPLICATION LANDSCAPES," the entirety of which is incorporated herein by reference.

TECHNICAL FIELD

The description is directed generally to complex and/or heterogeneous application landscapes involving numerous business scenarios launching various process activities across application landscapes and, in particular, to a computer network, a computer system, a computer-implemented method, and a computer program product for controlling application landscapes.

BACKGROUND

Computing concepts and/or principals such as cloud computing, service-oriented architecture (SOA) and/or IT (information technology) service management based on frameworks such as the IT infrastructure library enable the design and the creation of large (heterogeneous) information systems and/or complex networked application landscapes. Due to innovations, mergers, and/or acquisitions, (IT) application landscapes are becoming increasingly complex. Application landscapes may comprise one or more software applications, enterprise resource planning systems (ERPs), legacy systems, data warehouses, middleware for exchanging data, and/or connecting software applications, etc.

IT failure may be a high risk for a business far ahead of other factors such as financial risk and/or regulatory constraint. Complexity may be driven by cross-application usage, changing business requirements, and/or unknown dependencies between process, application, and/or infrastructure layers. Therefore controllability and maintainability may be important aspects for a good performance of said complex application landscapes.

Application landscapes however lack sufficient transparency and control in order for them to be kept alive. Furthermore, most application landscapes merely incorporate incomplete overviews of business scenarios, business scenarios with negligible use, and/or business scenarios which are not in use at all, but which are still in an application landscape. Therefore, control, development, and/or maintenance of application landscapes may be not supported.

Some concepts to control process activity for having power over single processes have been provided (see e.g. O. Daute, S. Conrad "Activity Control in Application Landscapes" LNICST 34, pp. 83-92, Springer, 2009). However, suitable mechanisms to run and to control application landscapes have been neglected. In particular, management control instances are not considered for application landscapes. For example, business scenarios can trigger process activities across a whole application landscape, use different applications, and/or exchange data. However, no outer control mechanisms on top of application landscapes are available. As a result controllability, maintainability and/or an ability to evolve application landscapes decrease constantly. Consequently, flexibility and/or an ability to change and/or modify (software and/or hardware) components of an application landscape are reduced. Furthermore, costs and maintenance time are increased.

Hence, there is a need for an improvement of controllability and maintenance of application landscapes including updates, landscape recovery, and/or landscape management tasks. Furthermore, improved mechanisms supporting landscape administrators to react more purposefully in case of faults and/or to avoid cost-intensive incidents are required.

SUMMARY

According to one general aspect a computer network is provided. The computer network may comprise:
  an application landscape comprising a plurality of software and/or hardware components and at least one sequence of processes (also referred to as a business scenario) which can run (is active and/or may be processed through components of the application landscape) in the application landscape (business scenarios which are intended to run in the application landscape may define a purpose and/or a realm of the application landscape); and
  a central control unit comprising a central control mechanism and a repository, wherein the central control unit is operable to control the application landscape and wherein the central control mechanism comprises an activation mechanism operable to:
    check in the sequence of processes for activation in the application landscape, comprising:
      requesting from the repository a specification of the sequence of processes;
      distributing the sequence of processes in the application landscape based on the specification;
      activating at least one process (also referred to as a business process) comprised in the sequence of processes in the application landscape; and
      taking over control of the at least one process of the activated sequence of processes in the application landscape; and
    check out the sequence of processes by deleting the specification of the sequence of processes from the repository if the sequence of processes is no longer in use in the application landscape.

The central control mechanism may implement control as a service (CaaS). Control as a Service (CaaS) may provide a surveillance approach for application landscapes to handle and/or manage their increasing complexity. Since numerous business scenarios may launch various business process activities across heterogeneous application landscapes, it might be vital to know where processing took place and will take place. The central control mechanism may provide a central service to ensuring business scenario operations in the application landscape. Dynamic control may enable better support of maintenance scenarios and may support to retain landscape integrity. The central control mechanism may also simplify appropriate reactions to disruptions in an application landscape. The central control mechanism may further enhance transparency to improve maintainability. Controllability of application landscapes may be challenging and may require a strong integration of technical issues in a more effective manner.

Available steering mechanisms to control application landscapes may mainly be focused on a specific area of information processing and are often proprietary. In contrast, the central control mechanism may provide a central service to ensuring the operation of business scenarios comprising one or more business processes in application landscapes. The central control mechanism supports various landscape management and maintenance activities of application landscapes, including control of business scenarios and/or business processes in application landscapes, activation and deactivation of business scenarios in application landscapes, defined startup and/or shutdown sequences of business scenarios in application landscapes, support of application landscape recovery comprising automatic recovery, if possible, support of maintenance scenarios, and/or synchronized software and/or hardware maintenance in application landscapes.

According to another general aspect, a computer-implemented method for controlling an application landscape is provided. The computer-implemented method may comprise:
  checking in a sequence of processes for activation in the application landscape, comprising:
    requesting from a repository a specification of the sequence of processes;
    distributing the sequence of processes in the application landscape based on the specification;
    activating at least one process comprised in the sequence of processes in the application landscape; and
    taking over control of the at least one process of the activated sequence of processes in the application landscape; and
  checking out the sequence of processes by deleting the specification of the sequence of processes from the repository if the sequence of processes is no longer in use in the application landscape.

The activation mechanism may be implemented as part of a central control mechanism. The central control mechanism may comprise in addition to the activation mechanism which may provide functionality to activate and/or deactivate a business scenario (sequence of processes) in the application landscape a decision control mechanism. The decision control mechanism may provide functionality to control one or more processes (business processes) of the business scenario in the application landscape. For example, in one implementation, the steps of activating a business process of the business scenario in the application landscape and taking over control of the business process of the activated business scenario may be performed by interaction with the decision control mechanism.

Furthermore, in one exemplary implementation, a run control process implemented in the central control mechanism may hand over to the activation mechanism if components and/or business scenarios need to be shut down and/or to be started-up in the application landscape.

The activation mechanism may comprise a check in procedure and a check out procedure. The check in procedure may take over a control of a business scenario by taking its specification from the repository. In an exemplary implementation, a unique identifier may be assigned to the business scenario and/or additional information may be requested by the activation mechanism, e.g. potential run-states of business process of the business scenario, how to handle incidents and/or recovery procedures for the business processes and/or the business scenario itself. The check out procedure may delete the business scenario from the repository if the business scenario is no longer in use (or active) in the application landscape. Furthermore, the check out procedure may force shutting down the business scenario and/or may therefore keep the application landscape clean from unwanted or resource consuming business processes.

Usually, business scenarios may be implemented on the software level by customizing and/or linking (software and/or hardware) components of the application landscape. Contrary, according to the present application, business scenarios may be activated and/or deactivated by the activation mechanism comprised in a central control mechanism. Such an implementation for controlling business scenarios may allow for better use of capacities and/or for improved control of business scenarios in case of incidents or emergency shutdowns of components of the application landscape.

Since most business scenarios may permanently run within the application landscape, their real use may be partially unclear and/or unknown without providing a central control mechanism comprising the activation mechanism. This may waste time and/or resource capacities of the application landscape. Furthermore, needless business scenarios may make maintenance scenarios for an application landscape unnecessarily complicated.

By controlling the business scenario in the application landscape by the central control mechanism comprising the activation mechanism, the availability of applications, processing units, and/or communication with business processes of the business scenario can be controlled, so that a snapshot of activities and/or dependencies within the application landscape may be easily derivable at any given time. That is, whenever problems may occur in the application landscape, impaired components can be detected easily and purposefully. Additionally, actions can be defined through the central control mechanism to regain landscape integrity on a functional level and/or on a data level.

According to another aspect, checking in the sequence of processes into the application landscape may further comprise: associating a unique identifier (unique ID) to the specification of the sequence of processes in the repository.

According to yet another aspect, checking in the sequence of processes into the application landscape may further comprise: requesting additional information about the sequence of processes comprising requesting at least one recovery procedure and a run-state of the at least one process; and storing the additional information in the repository in association with the sequence of processes.

According to yet another aspect, distributing the sequence of processes in the application landscape may comprise: distributing the sequence of processes in the application landscape by using a schema definition which defines the specification of the sequence of processes.

According to yet another aspect, the specification of the sequence of processes and the schema definition may be defined in XML.

According to yet another aspect, the method may further comprise: accounting the sequence of processes by determining time consumed and/or resources requested by the sequence of processes in the application landscape during processing.

The accounting procedure may determine time consumed and/or resources (e.g. components of the application landscape) requested by the business scenario when running (and/or being processed) in the application landscape. Outcomes of the accounting procedure may be used for optimization purposes including optimization purposes to lower costs and/or to increase effectiveness. Furthermore, the accounting procedure may be required for charging the usage of the application landscape.

According to yet another aspect, for all sequences of processes which are intended to run in the application landscape, a corresponding predefined specification may be stored in the repository.

Having specified and stored all possible business scenarios in the repository would ease and/or speed up the transition phase from the application landscape to the central control mechanism. In one exemplary implementation, the activation mechanism may then start with one or only a few business scenarios of all possible ones of the application landscape while processing runs as usual within the application landscape.

According to yet another general aspect, a computer system for controlling an application landscape is provided. The computer system may comprise:
an activation mechanism, wherein the activation mechanism is operable to:
  check in a sequence of processes for activation in the application landscape, comprising:
    requesting from a repository a specification of the sequence of processes;
    distributing the sequence of processes in the application landscape based on the specification;
    activating at least one process comprised in the sequence of processes in the application landscape; and
    taking over control of the at least one process of the activated sequence of processes in the application landscape; and
  check out the sequence of processes by deleting the specification of the sequence of processes from the repository if the sequence of processes is no longer in use in the application landscape.

According to yet another aspect, the computer network and the computer system are further operable to perform any of the methods as described.

In another general aspect there is provided a computer-program product comprising computer readable instructions, which when loaded and run in a computer system and/or computer network system, cause the computer system and/or the computer network system to perform a method as described.

The subject matter described in this specification can be implemented as a method or as a system or using computer program products, tangibly embodied in information carriers, such as a CD-ROM, a DVD-ROM, a semiconductor memory, signal and/or data stream, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various MRI machines.

Details of one or more implementations are set forth in the accompanying exemplary drawings and exemplary description below. Other features will be apparent from the description and drawings, and from the claims.

DETAILED DESCRIPTION

Figure 1:
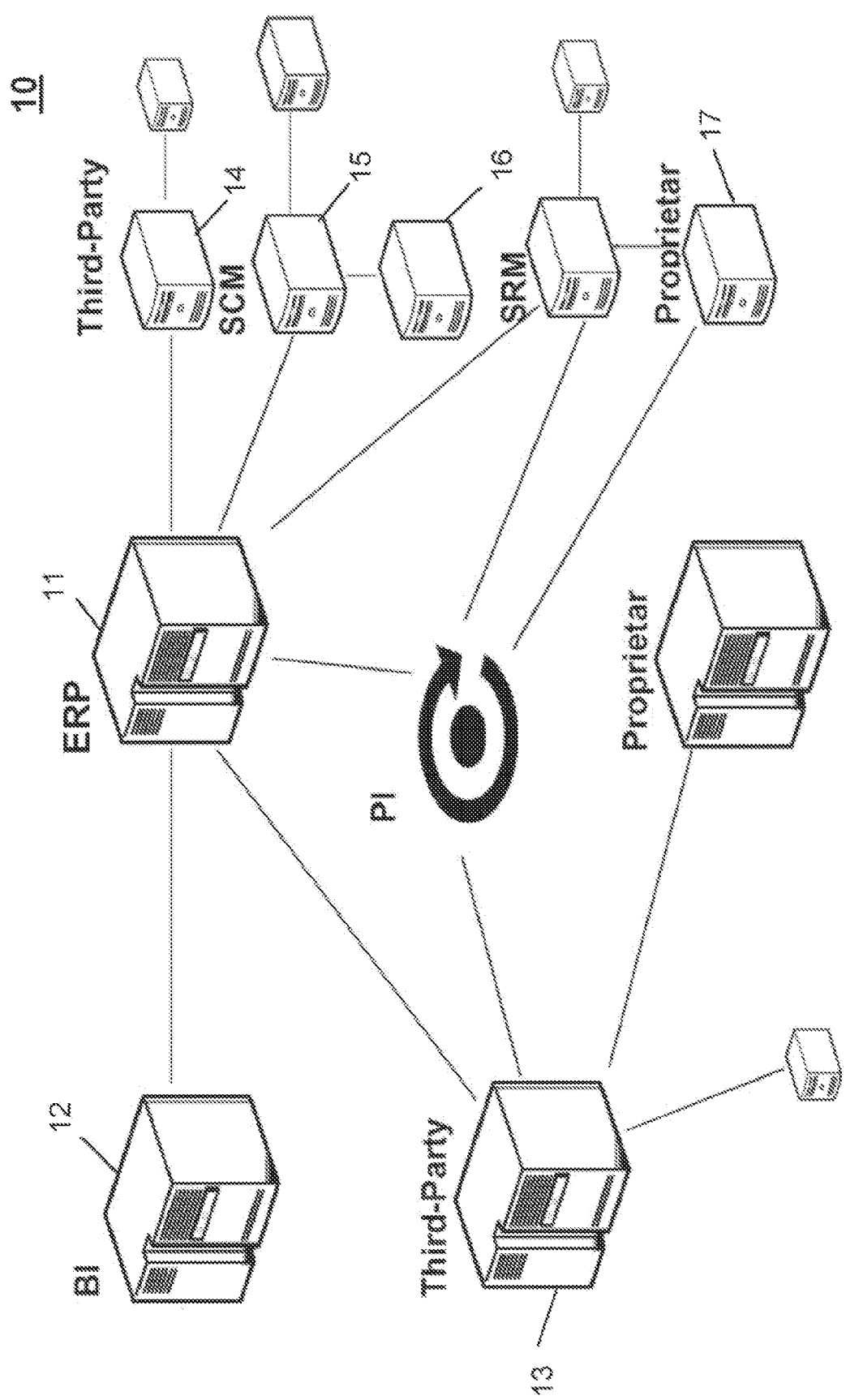
FIG. 1 shows an exemplary application landscape.

In the following, a detailed description of examples will be given with reference to the drawings. It should be understood that various modifications to the examples may be made. In particular, elements of one example may be combined and used in other examples to form new examples.

Technical Terms

Following technical terms are widely used throughout the description. The terms may refer to but are not limited to the subsequently given explanations.

Controllability

Controllability may be an important objective for a central control unit such as a management control instance (MCI) for controlling application landscapes. Controllability may play a crucial role in application landscape management and maintenance, such as stabilization of unstable conditions by communication with business processes being active in the application landscape. The state of an application landscape may describe the application landscape at a point in time. For example, information on the past of an application landscape may be helpful in predicting some future aspects of the application landscape. Such predictions can be made if the state of the application landscape at the present point in time is known. The state of the application landscape may be defined by the sum of the state values of (software and/or hardware) components of the application landscape and/or of business scenarios comprising one or more business processes running in the application landscape. Controllability may relate to the ability of an external central control unit to move the state of an application landscape from any current state to any other definitive state in a finite time interval.

Maintainability

Maintainability may relate to the ease with which a software system or a component can be modified to correct faults, to improve performance and/or other attributes, and/or to adapt to a changed environment. Furthermore, maintainability may relate to the ease with which a hardware and/or software component can be retained in, or restored to, a state in which it can perform its required functions. Additional aspects of maintainability may relate to availability, the ability to evolve (evolvability), reliability, longevity, and/or and system maintenance. One example of maintainability may relate to the abilities to retain long term maintainability of software from the development to the close-down of a software product. Evolvability of an application landscape may also relate to mechanisms for synchronized software maintenance of heterogeneous software products, landscape recovery, and/or deployment of new landscape functionalities.

Application Landscape, Business Process, Business Scenario

A business scenario may be also referred to as a sequence of processes and a business process may be also referred to as a process. An application landscape may comprise a plurality of solitary but integrated software and/or hardware components. The software components (also referred to as (software) applications) may be implemented in an application layer and the hardware components may be implemented in a hardware layer of an application landscape. An application landscape may provide functionalities for operating business scenarios comprising one or more business processes. A business process may relate to a (complex) process wherein one or more components are active in order to perform the business process. A business process may comprise a single task, for example, to read data and/or to provide results to users and/or to other processes. A business process may comprise an identifiable structure. A business scenario may relate to a sequence of business processes to fulfill a specific enterprise task comprising a bundle of single tasks. Business scenarios may run on different components across an application landscape. All business scenarios together may determine a purpose of an application landscape. Business scenarios may trigger activities (in terms of processes) across an application landscape by using diverse software and/or hardware components of the application landscape. If a failure occurs, then the business scenario and possibly one or more other business scenarios might be impaired. Said business scenarios may then halt anywhere in an application environment on a component of the application landscape in an inconsistent state. Maintainability aspects such as landscape recovery may be used to encapsulate the identification of impaired business processes of a failed business scenario, the consideration of dependencies to other business processes and/or components, the restart of single business processes, and/or the recovery of databases. After the determination of faulty applications and affected business processes, landscape recovery may reset the application landscape to a logically and/or functionally consistent state.

FIG. 1 shows an exemplary landscape application 10. The application landscape 10 comprises different heterogeneous software and/or hardware components 11 to 18 which are connected to each other as shown by the solid lines in FIG. 1 and which may operate together in the application landscape 10 e.g. to process a business scenario. The application landscape 10 may comprise an enterprise resource planning system (ERP) 11. The ERP 11 may integrate internal and external management information across an entire organization, embracing different activities and/or services of an enterprise. ERP systems automate said activities and/or services with an integrated computer-based application. ERP systems 11 can run on a variety of hardware and/or network configurations, typically employing a database to store its data. The ERP 11 may be associated with (e.g. directly or indirectly connected to and/or in (networked) communication with) a business intelligence (BI) component 12, one or more third parties 13 and 14, a supply chain management (SCM) component 15, and/or a supplier relationship management (SRM) component 16. The SRM 16 and/or the SCM 15 may further be associated with at least one proprietary service 17. Furthermore, at least one of the third parties 13 may also be associated with at least one proprietary service 18. The BI component 12 may provide historical, current, and predictive views of business processes and/or business scenarios, for example, performed on the ERP 11. Common functionality of business intelligence technologies may comprise reporting, online analytical processing, analytics, data mining, business performance management, benchmarking, text mining, and/or predictive analytics. The functionality may be used to support better decision making e.g. in the ERP 11. The SCM component 15 may manage a network of interconnected businesses involved in the provision of product and/or service packages required by end consumers such as the ERP 11. The SCM component 15 may span movement and storage of raw materials, work-in-process inventory, and finished goods from point of origin to point of consumption (also referred to as a supply chain). The SRM component 16 may specify collaboratively working with suppliers that are vital to the success of the ERP 11, e.g. to maximize the potential value of those relationships.

Management Control Instance (MCI)

A Management Control Instance (MCI) may be an exemplary implementation of a central control unit. A Management Control Instance (MCI) may relate to a landscape management approach to support maintenance scenarios and/or landscape management tasks. The MCI may comprise a knowledge base and/or a repository such as a Master-Maintenance Management Database (M3 DB). Furthermore, the MCI may comprise a central control mechanism such as a Business Scenario Control (BSC). The MCI may further comprise one or more agents or may interact with one or more agents associated with and/or connected to the MCI. The MCI is described in greater detail further below with reference to FIG. 3.

Master Maintenance Management Database (M3 DB)

Figure 2:
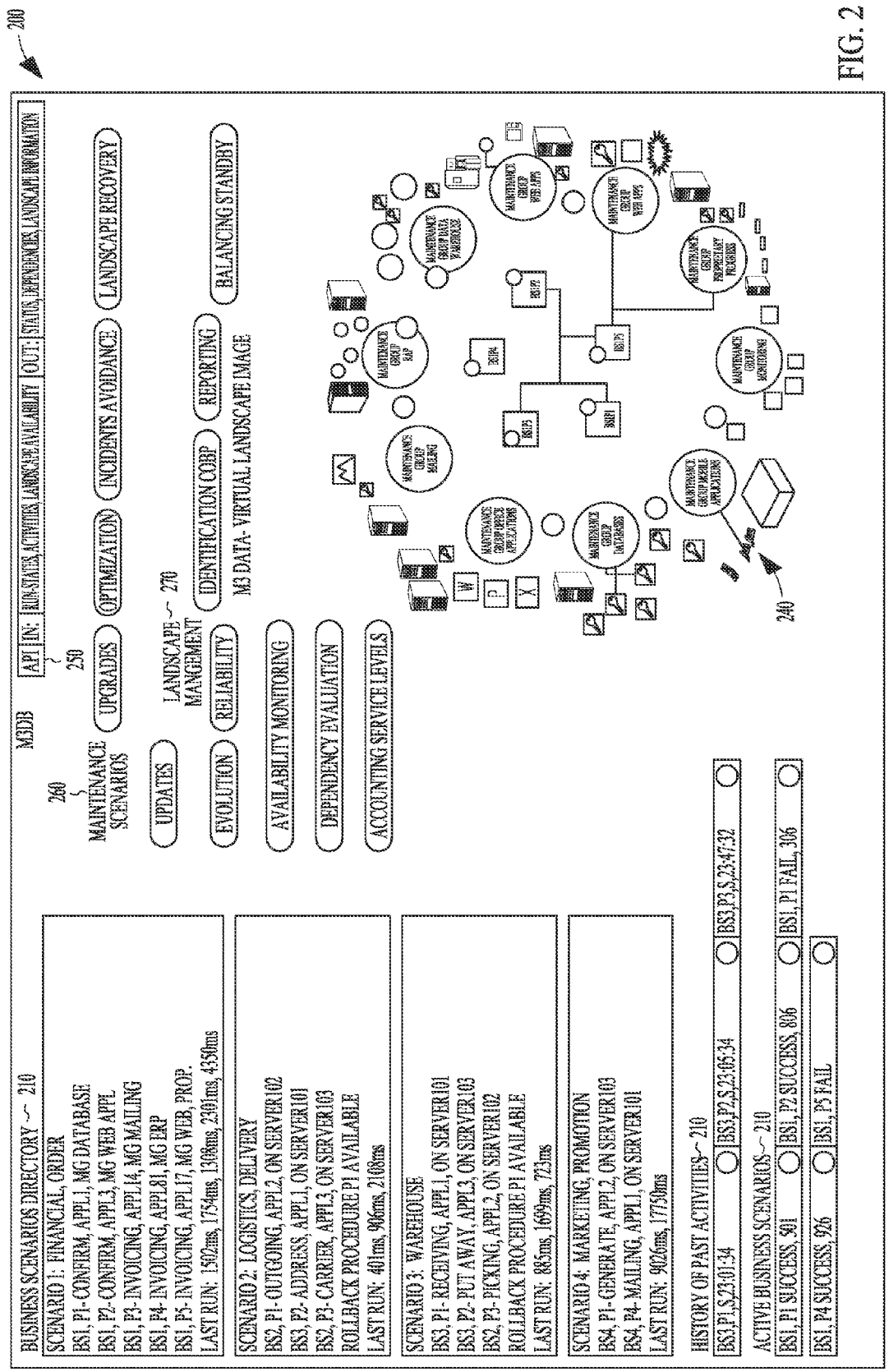
FIG. 2 shows an exemplary repository and/or knowledge base such as a master-maintenance management database (M3 DB).

A Master Maintenance Management Database (M3 DB) may be an exemplary implementation of a repository and/or a knowledge base. A M3 DB may be an open repository which may be focused on business scenarios on top of application landscapes. With reference to FIG. 2, an exemplary M3 DB 200 is shown. In general, the M3 DB 200 may be operable to continuously collect and/or store state information of hardware and/or software components as well as run-states of business processes running in application landscapes. Furthermore, a virtual landscape image (also referred to as image or virtual image) 240 of activities in an application landscape may be created. Said image 240 may be used for administration and application landscape (re-)design. Further knowledge can be derived from the M3 DB 200 including dependencies between components, business scenarios and/or business processes, weak points in components, business scenarios and/or business processes, alternate processing paths, frequencies of run and/or consumed time, and/or resources used to process a business scenario in the application landscape.

For example, the M3 DB 200 may comprise one or more different entities including a virtual landscape image 240, tables of business scenario activities 230, tables of history information 220, and/or a directory of business scenarios 210. Furthermore, the M3 DB may comprise maintenance scenarios 260 and/or landscape management applications 270. In the M3 DB 200, business processes may be considered as objects which comprise a run-state (e.g. active, successful, failed). The directory 210 may list business scenarios and may deliver information about deployed business processes, usage, run histories, and/or recovery procedures. The table of activities 230 may comprise run-state information of currently running business processes and/or business scenarios. The tables of history information 220 may store finished business processes and/or finished business scenarios. Finished businesses processes and/or business scenarios stored in the M3 DB 200 may support determination of a corresponding processing time. Agents (not shown in FIG. 2) interacting with the M3 DB 200 and/or included in the M3 DB 200 may gather information about hardware and/or software component availabilities. The agents may, for example, collect signs of life or throughputs of components. The virtual landscape image 240 may relate to a representation of artifacts, processes, and/or dependencies between components of an application landscape. Furthermore, a failure having a direct impact on the availability of components in the application landscape may be made visible. Failing components should be detected preferably immediately. Information collected and/or stored in the M3DB 200 may be used to support maintenance scenarios 260 and/or landscape management tasks 270. Maintenance scenarios 260 may comprise updates, upgrades, optimizations, incident avoidance, application migrations, evolution, and/or landscape recovery. Landscape management tasks 270 may be oriented on the IT support of a company's business by increasing the quality of IT solutions, theirs reliability and availability; and/or by finding better solutions to increase productivity and/or by reducing costs. Landscape management tasks 270 may comprise accounting, reporting, balancing and standby, identification, reliability, availability monitoring, and/or dependency evaluation. The M3DB may also provide an application programming interface (API) 250 for interaction with an application landscape such as the application landscape 10 as shown in FIG. 1.

Figure 3:
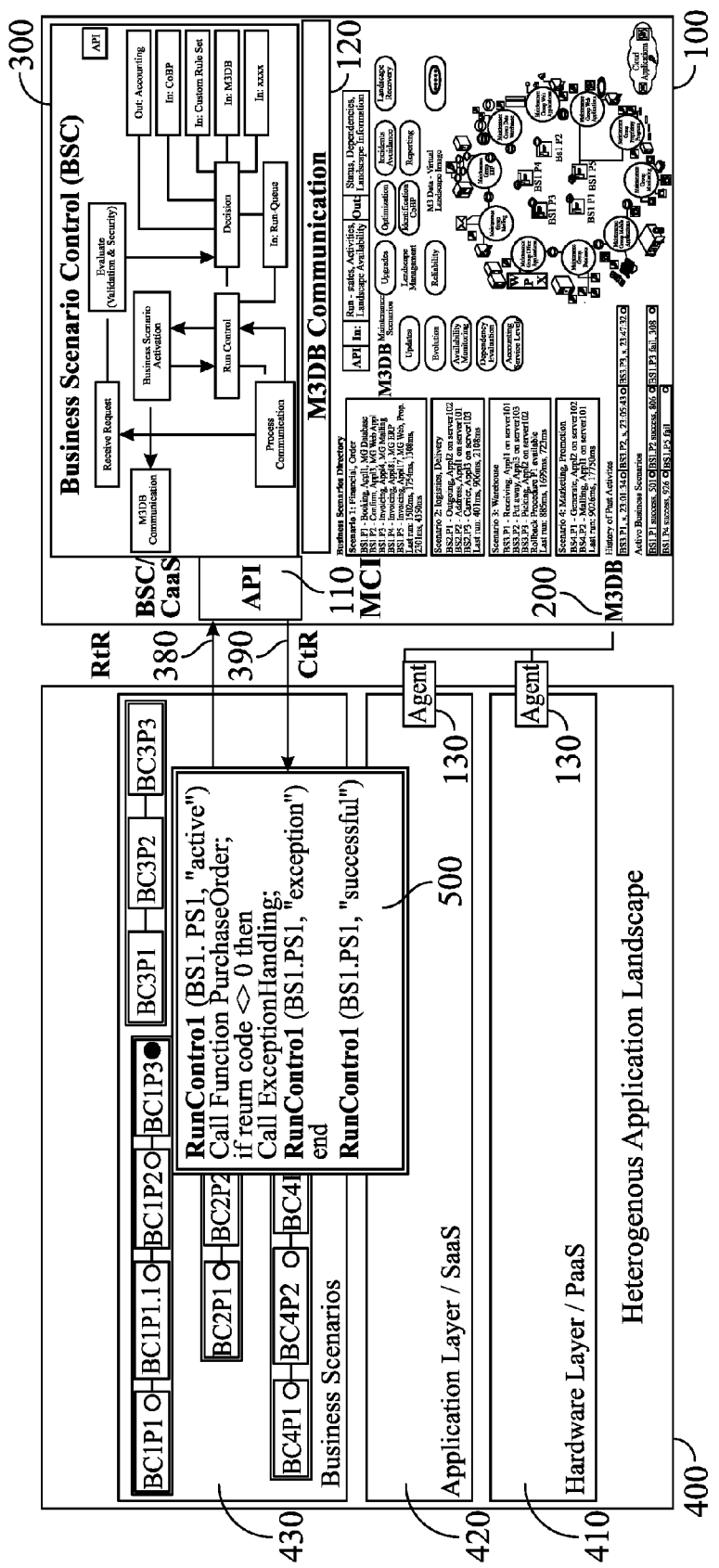
FIG. 3 shows an exemplary central control unit such as a management control instance (MCI).

FIG. 3 shows exemplary system architecture of a central control unit 100 such as a management control instance (MCI) coupled to and/or connected with an application landscape 400. The central control unit 100 can be used for managing, controlling, and/or surveying the application landscape 400.

The application landscape 400 basically comprises a hardware layer 410, an application layer 420, and one or more business scenarios 430. The business scenarios 430 may be operated (or run) in the application landscape 400. The hardware layer 410 may specify one or more hardware components which are directly or indirectly connected in the application landscape 400. The application layer 420 specifies one or more software components which are implemented and/or supported by the hardware components. The business scenarios 430 specify the possible business scenarios supported in the application landscape. An exemplary implementation of the application landscape 400 may be the landscape 10 shown in FIG. 1. Further exemplary implementations of the application landscape are shown in FIGS. 5, 6A, 6B, and 6C.

The central control unit 100 comprises a central control mechanism 300 such as a business scenario control (BSC) and a repository (or knowledge base) such as a Master Maintenance Management Database (M3DB) 200. The central control unit 100 such as the MCI 100 provides a landscape management approach which supports maintenance scenarios and/or landscape management tasks.

The M3DB 200 is a repository comprising information about business scenarios, activities, run-states, and/or dependencies between business processes of the business scenarios 430, and/or components in the application layer 420 and/or in the hardware layer 410. Examples of hardware and/or software components may comprise (software) applications and/or processing units. The M3DB 200 is described in greater detail above with reference to FIG. 2.

The BSC 300 supports enhanced control and/or more reliability of distributed business scenarios operated in the application landscape 400. The BSC 300 considers the current state of the application landscape 400 and run-states of active business processes of business scenarios 430 operated in the application landscape 400. The BSC 300 may implement functionality to support Control as a Service (CaaS). CaaS may be a surveillance approach for application landscapes 400 to coping with the increasing complexity. CaaS enables various landscape management and/or maintenance tasks, like activation of business scenarios, startup and/or shutdown sequences, landscape recovery, and/or synchronized software maintenance. One aspect of CaaS may comprise the following basic or general specification: While at least two groups of components may be locked by a CaaS process of the BSC 300 in an application landscape 400, further accesses of (other) business scenarios are rejected in the application landscape 400. Backup directives can be offered for the other business scenarios and/or the (other) requesting business scenarios have to wait. The CaaS process may ensure that the states of the components comprised in the application landscape 400 are known so that indeterminate run-states in the application landscape 400 can be avoided.

Hence, the BSC 300 controls business scenarios 430 and their associated business processes of application landscapes 400 and/or supports different maintenance scenarios. The BSC 300 may enable the avoiding of indeterminate processing states. Therefore, the BSC 300 collects run-states of business processes and/or determines a state of a business scenario 430 based on the run-states of the comprised business processes. Run-states of business processes and/or states of business scenarios are transferred to the M3DB 200. The BSC 300 is described in greater detail below with reference to FIG. 4.

Furthermore, the MCI 100 comprises an application programming interface (API) 110 for communication with the application landscape 400, an interface 120 for communication between the M3DB 200 and the BSC 300, and/or one or more agents 130.

The API 110 provides functionality to exchange run control commands 500 between the application landscape 400 and the BSC 300 by exchanging request to run 380 and confirmation to run 390 messages for controlling business processes of business scenarios 430 running in the application landscape.

Run control commands 500 can be used to receive information about a run-state of a business process running in the application landscape 400. Run control commands 500 can also control the progress of business process activities in the application landscape 400. Several options may be used to implement the run control commands 500. In one exemplary implementation run control commands 500 are inserted into the source code of components operating in the application landscape 400. This may be a reliable approach, in particular for newly designed components and/or applications in the application landscape 400. For components already existing in the application landscape 400, in one implementation, adaptations are possible, for example during a migration of components in the application landscape 400. In an other exemplary implementation, reverse engineering can be applied to enrich source code of components in the application landscape 400 with run control commands 500. Regarding functionality of run control commands 500, a run control command 500 sends, in addition to run-state information of a business process running in the application landscape 400 a request to run 380 to the BSC 300. A control function implementing the run control commands 500 at the application landscape 400 waits until it receives a corresponding confirmation to run 390 from the BSC 300 before allowing the involved business process to further process in the application landscape 400. The run control commands 500 can keep an application landscape 400 under control. Therefore, components specifying an application landscape 400 should be developed with regard to run-state information and/or run control commands 500.

The agents 130 may interact with the M3DB 200 and may gather information about hardware and/or application availabilities in the application landscape 400. The agents may, for example, collect signs of life or throughputs of components of the application landscape 400.

Figure 4:
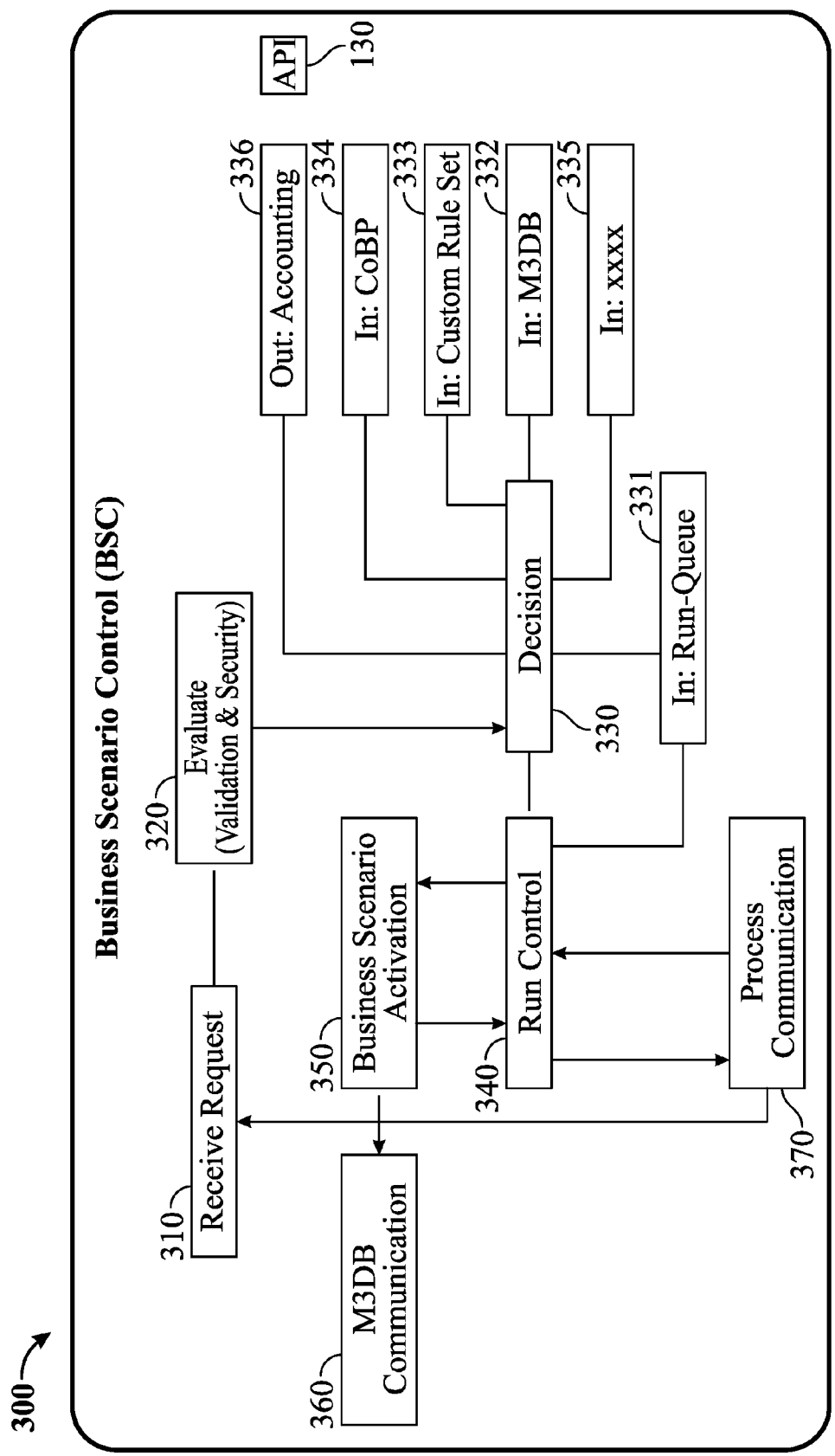
FIG. 4 shows an exemplary central control mechanism such as a business scenario control (BSC) implemented within a central control unit for an application landscape.

FIG. 4 shows an exemplary implementation of a central control mechanism 300 such as a business scenario control (BSC). Basically, the BSC 300 relates to a concept of having not only power over business processes running in an application landscape in order to reduce incidents and to gain control of application landscape activities. Additionally, the BSC 300 further focuses on an activation mechanism 350 for activating business scenarios in an application landscape. The activation mechanism 350 may be referred to as a business scenario activation 350. FIG. 4 describes the basic components of the BSC 300. The activation mechanism 350 is described in greater detail below with reference to FIG. 5.

The BSC 300 is implemented as a central control mechanism or instance for controlling business scenarios running in an application landscape. The BSC 300 is operable to monitor its own availability. Monitoring its own availability by the BSC 300 itself might be necessary to prevent the BSC 300 from becoming a single-point of failure for an application landscape. Therefore, in one exemplary implementation, at least two instances of the BSC 300 run within an application landscape. In the exemplary implementation, one running instance of the BSC 300 may take over a master role and another running instance of the BSC 300 may functions as a backup. For example, in order to improve performance of the central control mechanism 300, more than one instance of the BSC 300 may exist. In case at least two instances of the BSC 300 are foreseen, one can be considered as a 'leading' instance which is referred to as the master instance having the master role and which is operable to give directives and/or instructions to other supporting and/or backup instances of the BSC 300. The BSC 300 associated with the master role may be responsible for coordinating, activating, and/or assigning specific tasks to other supporting instances of the BSC 300. If the instance functioning as the master instance of the BSC 300 is not available, then the other instance may become the master instance. In normal operation, the other (second) running instance of the BSC 300 and/or an additional instance of the BSC 300 may answer incoming requests for run 380. In this way, delays in the controlling of business scenario and/or business process activities in an application landscape can be avoided.

The BSC 300 basically comprises a decision control mechanism including one or more entities 310, 320, 330, 340, the business scenario activation 350, a custom rule set (not shown), code of business processing (CoBP) (not shown), a communication interface to a knowledge bases and/or a repository 360, and/or business process processing and/or process communication 370. Furthermore, the BSC 300 may comprise an application programming interface (API) 130 e.g. for communication with another component such as the central control unit 100 and/or the application landscape 400.

The custom rule set (not shown) comprises customized rules which are defined for an application landscape. The customized rule set may comprise an alteration of priorities for business processes and/or business scenarios, e.g. a list of selected and/or specified business scenarios which have to run in the application landscape. Furthermore, selected processing units and/or timetables of maintenance work may be defined in the customized rule set. When controlling business scenarios running in the application landscape, the BSC 300 take information specified in the customized rule set into account during its decision making process.

The code of business processing (CoBP) (not shown) may be implemented for activity control. The CoBP comprises general rules and/or requirements for using an application landscape. In one exemplary implementation, the CoBP may only be applied to business processes which are considered to be imported for the application landscape. The CoBP may implement one or more rules which need to be considered in the application landscape during processing of business scenarios. The CoBP may comprise and/or implement one or more of the following rules: Each business process should have a unique form of identification, e.g. a unique identifier (unique ID). The unique ID may be used to identify a business process and/or to steer the business process while it is active in the application landscape. Each business process should comprise have a given priority. The higher the associated priority of a business process is, the earlier the corresponding business process should be processed, unless the BSC 300 decides it differently. Each business process should be documented. A business process should belong to a business scenario and visualization of the business process should exist. Procedures should be given for recovery purposes in case of a failure of a business process running in the application landscape 400. The higher an associated priority of a business process is the higher is the charge for a business process. A business process with a high associated priority may comprise a significant impact on all other business processes that run within the application landscape 400. In one exemplary implementation, communication between business processes take place on traceable ways so that functionality and/or resources of components of the application landscape 400 are used by business process of a business scenario in the application landscape 400 which are released for use and/or which are able to record information about requested activities. Business processes should use defined and traceable ways in the application landscape for processing. This may force the use of known interfaces, improves the traceability and supports the maintainability of application landscapes.

For example, traceable ways may be able to identify which changes have been made and/or have been performed by process activities. A traceable way may describe and/or specify which functionality and/or resources of components of the application landscape 400 have been used and/or requested by a business scenario.

The decision-control mechanism comprises one or more of the following activities or processes: a receive request process 310, an evaluate process 320, a decision process 330, and/or a run control process 340. Each of the processes may comprise one or more tasks.

The receive request process 310 receives and/or registers an incoming request for run 380 in sequence as the requests for run 380 come in to a central control unit such as the MCI 100 (see FIG. 3). The request for run may be handed to the request process 310 in the BSC 300 through the process communication 370. Whenever a business process starts or stops or changes its run-state in an application landscape, then a run control command (e.g. run control commands 500 as shown in FIG. 3) is executed in the application landscape and sends a request for run to the central control unit. The request for run is a message that comprises a process identifier (ID) and/or a state of running of the business process. Therefore, an overview of current business process activities in the application landscape is available at any point in time.

For using run control commands 500 within an implementation of the BSC 300 in a central control unit such as the MCI 100, run control commands 500 are sent from the application landscape 400 through the API 110 of the MCI 100 directly to the BSC 300 as it is shown in FIG. 3. The BSC 300 forwards or sends received run control commands 500 to the M3DB 200.

The evaluate process 320 validates the incoming request for run 380 against information stored in a repository such as the M3DB 200 (see FIG. 3). As shown in FIG. 3, the tables of activities 220 and 230 in the M3DB 200 reflect a status of business process activities within the application landscape 400. Problems regarding the availability of components such as applications or processing units which possibly could occur in the application landscape 400 are taken into consideration.

The decision process 330 is based on different input information including a run information 331 of a currently considered request for run of a business process taken from a run queue, repository information 332 from a repository, rule information 333 from a rule set, code information 334 from code of business processing, and/or additional information 335 possibly from another data source. In one exemplary implementation, the decision process 330 reads run-state information of business processes from the tables of activities 220 and 230 in the M3DB 200 (see FIG. 3). Run-state information of a business process reflects a current status of process activities of the business process within the controlled application landscape. The decision process 330 checks previous (business) process executions in the application landscape relating to the business process. Depending on the performed checks, the decision process 330 decides whether to return a confirmation to run to the application landscape for the considered business process or to stop and/or halt (e.g. to postpone) the considered business process from running in the application landscape. In case any incidents to applications, processing units or business processes and/or business scenarios in the application landscape are determined in the decision process 330 regarding the considered business process, then the decision process 300 determines that a request for run might be affected. The decision of the decision process 330 may be published to a further process in the BSC 300 through an accounting 336.

The run control process 340 provides steering and/or communication functionality with an application landscape under control. The run control process 340 receives an incoming request for run from an application landscape and forwards the request for run to the receive process 310. Furthermore, after a decision is computed in the decision process 330, the run control process 340 possibly sends a corresponding confirmation to run in because the considered business process is allowed to run in the application landscape. If the business process must be paused or postponed, the run control process 340 waits to send a corresponding conformation to run to the application landscape, until related problems hindering the business process from running in the application landscape are solved and/or informs the requesting business process accordingly. Furthermore, the run control process 340 hands over to the activation mechanism 350. The run control process 340 may hand over to the activation mechanism 350 if components and/or business scenarios in the application landscape need to be shut down and/or to start-up business scenarios and/or components in the application landscape if needed. The activation mechanism 350 is described in greater detail below with reference to FIG. 5.

Figure 5A:
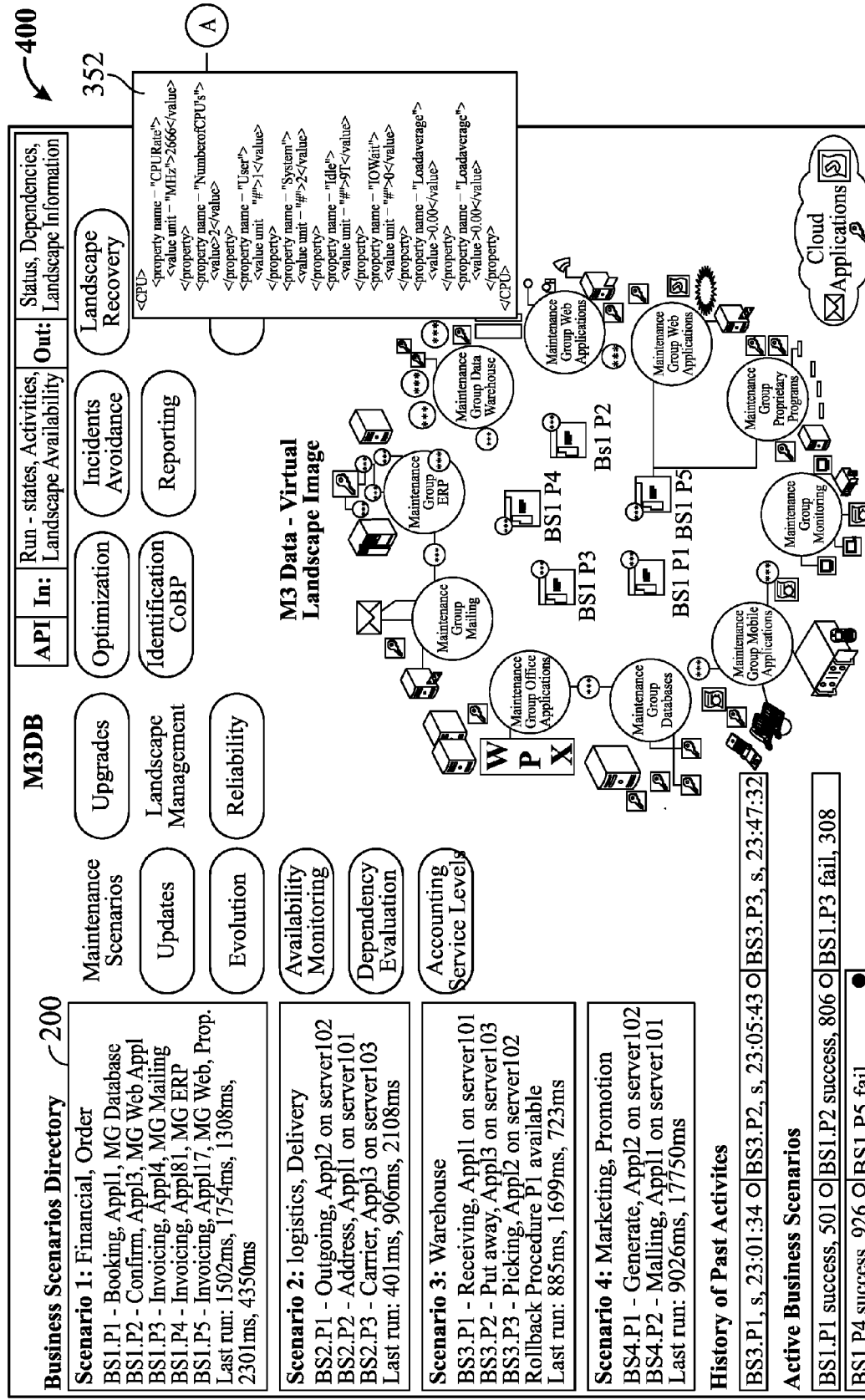
FIG. 5 shows an exemplary method of activating a business scenario in an application landscape by an activation mechanism such as a business scenario activation of a central control unit.
Figure 5B:
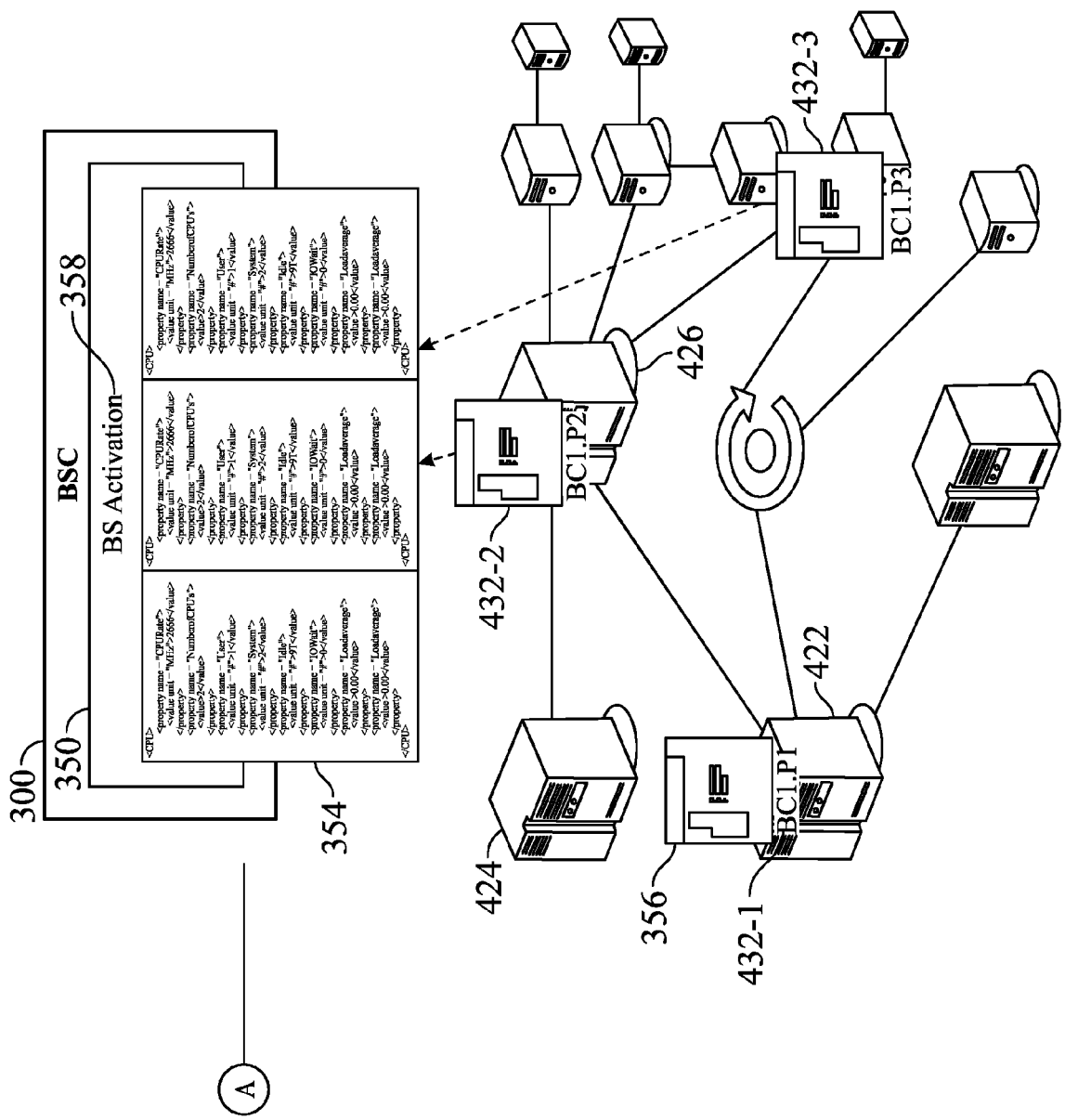

With reference to FIG. 5, an activation mechanism 350 for business scenario 432 and business process 432-1, 432-2, 432-3 control within a central control mechanism 300 such as a BSC is shown. The central control mechanism 300 implements control as a service (CaaS) for application landscapes 400. Such a central control mechanism 300 may however also be implemented not only with application landscapes but also with any other kind of distributed and/or complex application environments.

Available steering mechanisms to control application landscapes are mainly focused on a specific area of information processing and are often proprietary. In contrast, the central control mechanism 300 provides a central service to ensure the operation of business scenarios comprise one or more business processes in application landscapes. The central control mechanism 300 supports various landscape management and maintenance activities of application landscapes, including control of business scenarios and/or business processes in application landscapes, activation and deactivation of business scenarios in application landscapes, defined startup and/or shutdown sequences of business scenarios in application landscapes, support of application landscape recovery comprising automatic recovery, if possible, support of maintenance scenarios, and/or synchronized software and/or hardware maintenance in application landscapes.

Interaction of the central control mechanism 300 with business processes 432-1, 432-2, 432-3 is described above with reference to FIG. 4. The communication processes and/or methods of FIG. 4 enable the BSC 300 to take over control of business processes 432-1, 432-2, 432-3 running in an application landscape 400 on the basis of data received from a repository 200 such as the M3DB. With reference to FIG. 4, during the run control process 340 and/or in communication 360 with the repository 200, the central control mechanism 300 invokes an activation mechanism 350 for activating business scenarios in an application landscape which is also referred to as business scenario activation 350.

Usually, business scenarios are implemented on the software level by customizing and/or linking applications such as components 422, 424, and/or 426 of an application landscape 400. According to an implementation of control as a service using a central control mechanism 300, business scenarios such as business scenario 432 comprising business processes 432-1, 432-2, 432-3 are activated and deactivated by the central control mechanism 300. Activating and deactivating business scenarios 432 through the central control mechanism 300 by an activation mechanism 350 may be advantageous since it allows for better use of capacities and improved control of business scenarios 432 in case of incidents and/or emergency shutdowns of one or more components 422, 424, 426 of the application landscape 400.

In one exemplary implementation, all business scenarios 432 that may run in the application landscape 400 are controlled by the central control mechanism 300 and are specified and stored in a repository 200. Furthermore, the business scenarios 432 can be requested from the repository 200 by the central control mechanism 300 whenever needed. In another exemplary implementation, not all business scenarios 432 that may run in the application landscape 400 are specified in the repository 200. Having specified and stored all possible business scenarios 432 in the repository 200 would ease and/or speed up the transition phase from the application landscape 400 to the central control mechanism 300. The central control mechanism 300 may start with one or only a few business scenarios 432 of all possible ones of the application landscape 400 while processing runs as usual within the application landscape 400.

Since most business scenarios permanently run within the application landscape, their real use is partially unclear or unknown without providing a central control mechanism. This may waste time and/or resource capacities of the application landscape. Furthermore, needless business scenarios are making maintenance scenarios for an application landscape unnecessarily complicated.

To implement the activation mechanism 350 within the central control mechanism 300, a check in procedure, a check-out procedure, and/or an accounting procedure are implemented within the central control mechanism 350.

The activation mechanism 350 operated in the central control mechanism 300 implements the check in procedure comprising one or more of the following processing steps. At 352, a specification or definition of a business scenario 432 which is to be activated in the application landscape 400 is requested from the repository 200 by the activation mechanism 350 of the central control mechanism 300. In one exemplary implementation, the specification of a business scenario 432 may be defined in XML (eXtensible Markup Language). At 354, the business scenario 432 is distributed in the application landscape 400 through the central control mechanism 300 and in particular by the activation mechanism 350. The distribution of the business scenario 432 may be performed through an XML Schema definition defining the XML description of the business scenario received at 352. At 356, the business processes 432-1, 432-2, 432-3 of the business scenario 432 are activated. At 358, the business processes 432-1, 432-2, 432-3 report their start to the activation mechanism 350 of the central control mechanism 300 if successful. Then the central control mechanism 300 takes over control of the business processes 432-1, 432-2, 432-3 of the business scenario 432 so that the business scenario 432 is ready for operation. Control of the business processes 432-1, 432-2, 432-3 of the business scenario 432 may be performed by the decision making mechanism in the central control mechanism 300.

If the business scenario 432 is not used anymore in the application landscape 400 and can be shut down, the activation mechanism 350 sends a message to the business processes 432-1, 432-2, 432-3 of the business scenario 432 and waits for the business scenario 432 to finish.

Synchronization of software maintenance requires clustering of components by means of maintenance groups. Components which interact closely with other components should be maintained at once to gain time and/or costs. Therefore update and/or upgrade procedures of components require common maintenance mechanisms. Implementing a central control unit comprising a central control mechanism which supports control as a service in application landscapes supports and/or enables protection of components and/or maintenance groups against access from business scenarios while a maintenance group is under construction. Furthermore, the central control mechanism is operable to activate specific maintenance scenarios for automation of an update procedure within an application landscape.

The check-in procedure takes over the specification of a (new) business scenario 432 in the repository 200. During check-in of the business scenario 432, a unique identifier (unique ID) is associated and/or assigned to the business scenario 432 in the repository 200, e.g. to the specification of the business scenario in the repository 200. Additional information regarding the business scenario 432 including recovery procedures and/or possible run-states of business processes 432-1, 432-2, 432-3 of the business scenario 432 are requested and stored in the repository 200 in association with the business scenario 432 (and/or its specification). Having checked-in the business scenario 432, it is ready to be used.

The check-out procedure deletes the business scenario 432 from the repository 200 if the business scenario 432 is no longer used in the application landscape 400. Before checking out the business scenario 432, the activation mechanism 350 is requested to shut down the business scenario 432.

The accounting procedure determines time consumed and/or resources (e.g. components 422, 424, 426 of the application landscape 400) requested by the business scenario 432 while the business scenario 432 has been active in the application landscape 400. Outcomes of the accounting procedure may be usable for optimization purposes including optimization purposes to lower costs and/or to increase effectiveness. Furthermore, the accounting procedure may be required for charging the usage of the application landscape 400 including different components 422, 424, 426. Additionally, a provider of the business scenario 432 may need the accounting procedure to calculate invoices for the business scenario 432 offered to a consumer.

By monitoring and/or controlling the business scenario 432 in the application landscape 400 by the central control mechanism 300 comprising the activation mechanism 350, the availability of applications, processing units, and/or communication with business processes 432-1, 432-2, 432-3 of the business scenario 432 are controlled, so that a snapshot of activities and/or dependencies within the application landscape 400 may be derived at any given time. That is, whenever incidents are occurring in the application landscape 400, impaired components 422, 424, 426 can be detected easily and purposefully. Actions can be defined by the central control mechanism 300 (scope of landscape recovery) to regain landscape integrity on functional and data level.

Figure 6A:
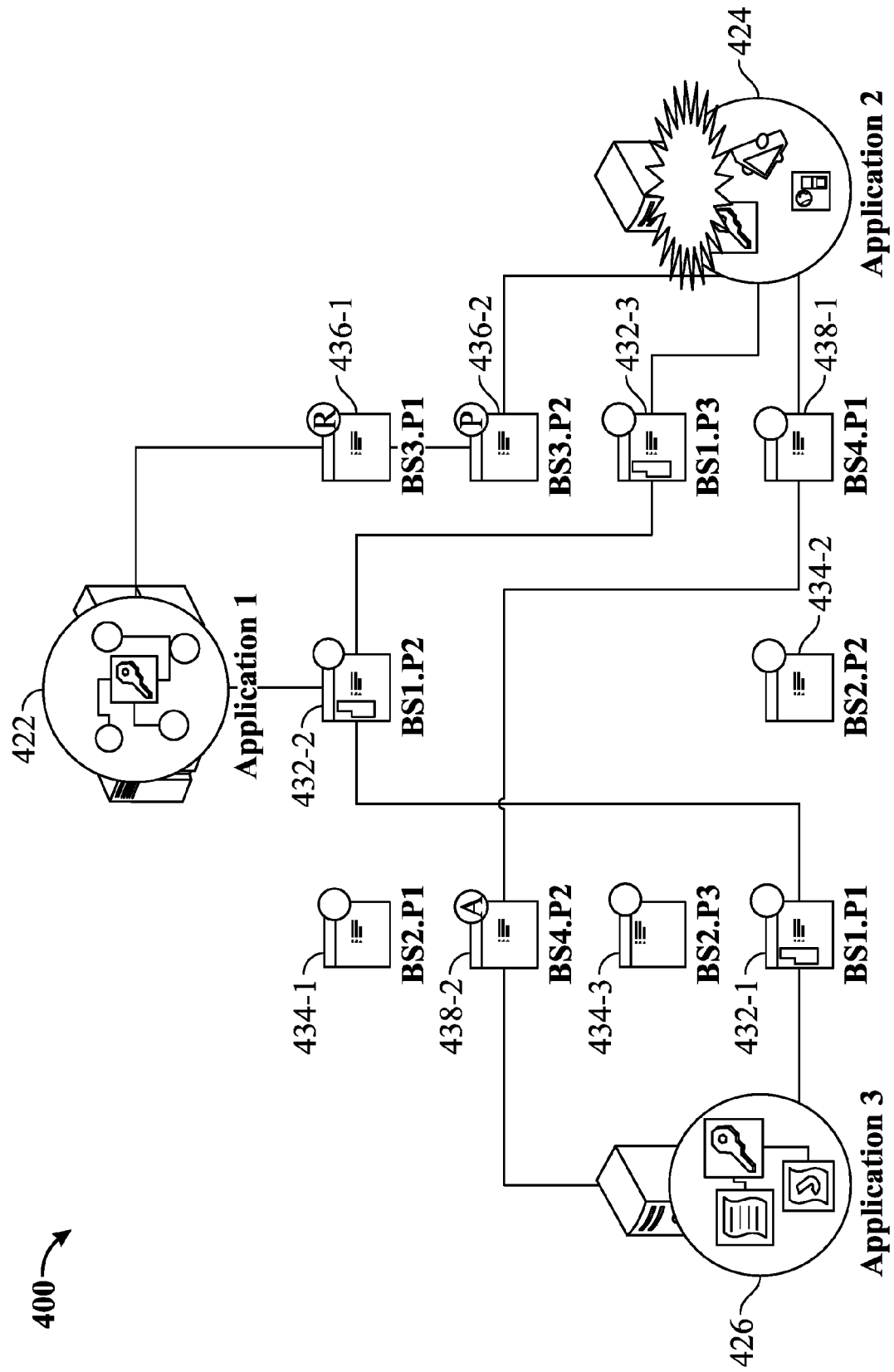
FIG. 6A shows an exemplary application landscape operated without a central control unit.
Figure 6B:
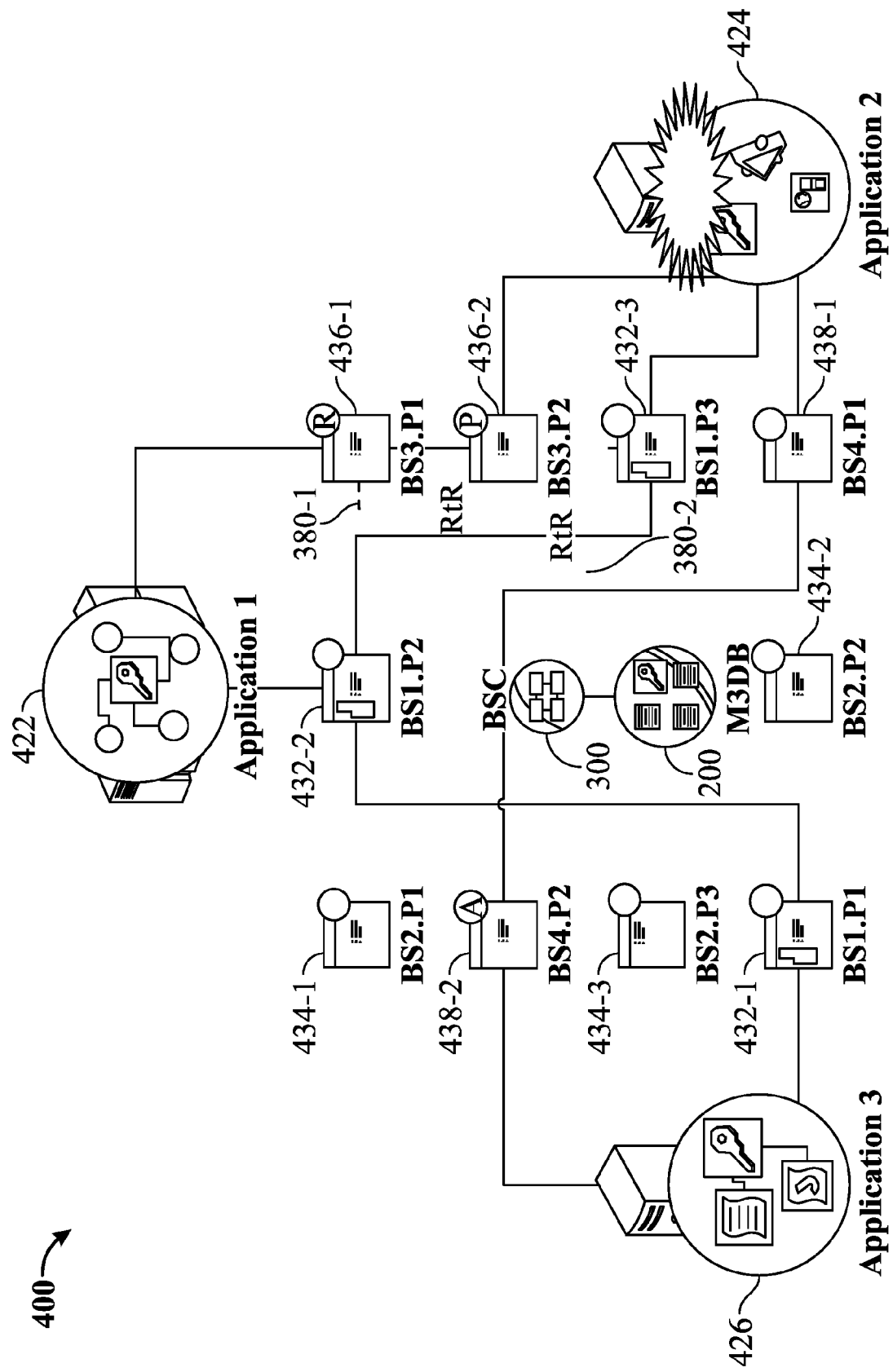
FIGS. 6B and 6C show an exemplary application landscape operated with a central control unit.
Figure 6C:
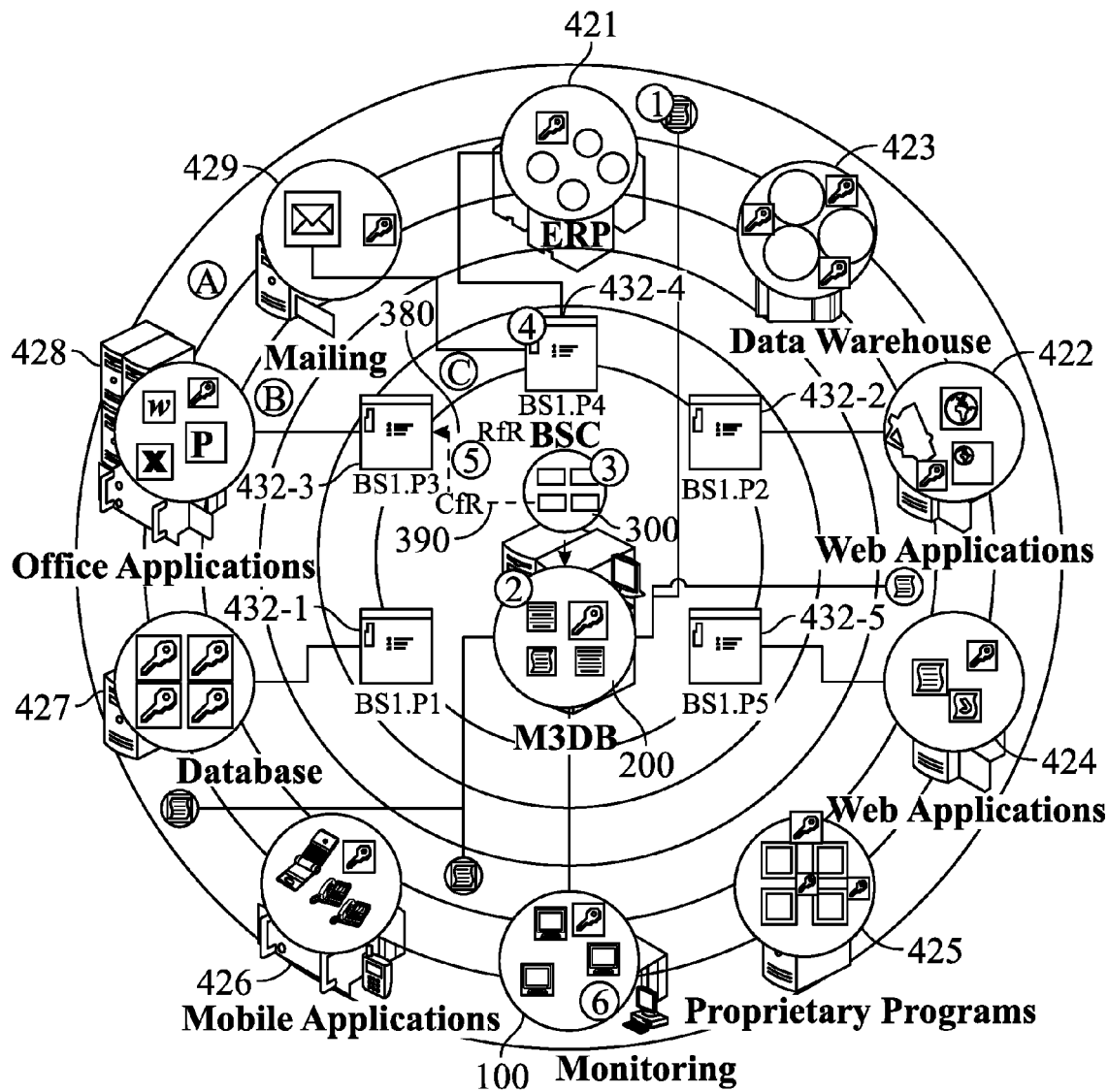

FIGS. 6A, 6B, and 6C show an exemplary operation of an application landscape 400.

FIG. 6A shows operation of the application landscape 400 without control by a central control mechanism such as a BSC. Hence, as can be seen from FIG. 6B, business processes 432-1, 432-2, 432-3, 434-1, 434-2, 434-3, 436-1, 436-2, 438-1, 438-2 of different business scenarios 432, 434, 436 438 running in the application landscape 400 comprising one or more components 422, 424, 426 are not controlled by a supervising and/or controlling unit such as a central control unit comprising a central control mechanism and a repository. Consequently, neither a central control mechanism nor an additional repository and/or knowledge base is comprised. Consequently, there is provided only an incomplete view of activities (e.g. performed by one or more of the business processes 432-1, 432-2, 432-3, 434-1, 434-2, 434-3, 436-1, 436-2, 438-1, 438-2) and/or of dependencies between the business processes 432-1, 432-2, 432-3, 434-1, 434-2, 434-3, 436-1, 436-2, 438-1, 438-2, between the business scenarios 432, 434, 436, 438 and/or the components 422, 424, 426 in the application landscape 400. Furthermore, run-states of the business processes 432-1, 432-2, 432-3, 434-1, 434-2, 434-3, 436-1, 436-2, 438-1, 438-2 are indeterminate. Consequently, also the states of the corresponding business scenarios 432, 434, 436 438 cannot be determined in the application landscape 400. Hence, there might exist inconstancies between business scenarios 432, 434, 436 438 in the application landscape 400. Furthermore, since no control is provided in the application landscape 400, a right time point for recovery in case of a failure is difficult to determine for the business scenarios 432, 434, 436, 438 and hence for the application landscape 400 itself. This however leads to a weak performance of the application landscape 400.

FIG. 6B shows operation of an application landscape 400 with and/or under control of a central control unit. The central control unit comprises a central control mechanism 300 such as a BCS and a repository or a knowledge database 200 such as a M3DB. The central control unit is placed in connection with the application landscape 400 or as part of the application landscape 400 and interacts with each business process 432-1, 432-2, 432-3, 434-1, 434-2, 434-3, 436-1, 436-2, 438-1, 438-2 of a business scenario 432, 434, 436, 438 changing its run-state e.g. by requesting to run in the application landscape 400.

The application landscape 400 comprises one or more software and/or hardware components 422, 424, and 426. The components 422, 424, and 426 interact and/or communicate with each other to perform and/or to process one or more business scenarios 432, 434, 436, 438 when they 432, 434, 436, 438 run in the application landscape 400. Each of the business scenarios 432, 434, 436, 438 run one or more business processes 432-1, 432-2, 432-3, 434-1, 434-2, 434-3, 436-1, 436-2, 438-1, 438-2 during processing. For example, for processing the business scenario 432, business processes 432-1, 432-2, and 432-3 are executed. Similarly, for processing the business scenario 434, business processes 434-1, 434-2, and 434-3 are executed. Similarly, for processing the business scenario 436, business processes 436-1 and 436-2 are executed. Similarly, for processing the business scenario 438, business processes 438-1 and 438-2 are executed. Dependencies between business scenarios 432, 434, 436, 438, business processes 432-1, 432-2, 432-3, 434-1, 434-2, 434-3, 436-1, 436-2, 438-1, 438-2, and/or components 422, 424, 426 in the application landscape 400 are shown by continuous lines in FIG. 6B. For example, a first business process 436-1 of a business scenario 436 requests for a run 380-1. The request for run 380-1 is received at the central control mechanism 300 which controls the request for 380-1 as e.g. described above with reference to FIG. 4. Furthermore, for example, an active business process 432-3 processed during processing of a business scenario 432 has failed. The failed business process 432-3 sends a request to run 380-1 to the central control mechanism 300, which controls the request to run 380-2 accordingly as described with reference to FIG. 4. In particular, if database problems are known (as shown in FIG. 6B, application 424 has a failure caused by the failed business process 432-3), the central control mechanism 300 may decide to keep away other business processes e.g. business process 436-2 to start. This may avoid uncaught incidents and/or may enable to provide an alternate processing path. Information collected about business process run-states by the central control mechanism 300 is stored synchronously in the repository 200 to keep a virtual landscape image (see FIG. 2) of the application landscape 400 up to date.

In one exemplary implementation and as shown in FIG. 6B, communication of a central control unit comprising the central control mechanism 300 and business processes 432-1, 432-2, 432-3, 434-1, 434-2, 434-3, 436-1, 436-2, 438-1, 438-2 of business scenarios 432, 434, 436, 438 running in the application landscape 400 make use of run control commands (e.g. run control commands 500 a shown in FIG. 3). In another implementation, web standards such as XML-RPC (remote procedure call) transmits for each of the business processes 432-1, 432-2, 432-3, 434-1, 434-2, 434-3, 436-1, 436-2, 438-1, 438-2 a corresponding process identifier (process ID) and/or an associated run-state to the central control mechanism 300.

Similar to FIG. 6B, FIG. 6C shows a further example of operation of the application landscape 400 with and/or under control of a central control unit 100. The central control unit comprises a central control mechanism 300 such as a BCS and a repository or a knowledge database 200 such as a M3DB. The central control unit 100 is placed in connection with the application landscape 400 or as part of the application landscape 400 and controls and/or interacts with each of the business processes 432-1, 432-2, 432-3, 432-4, 432-5 of a business scenario 432 running in the application landscape 400. For example, a run-state of each of the business processes 432-1, 432-2, 432-3, 432-4, 432-5 is requested and stored in the repository 200 e.g. if a business process 432-1, 432-2, 432-3, 432-4, 432-5 changes its run-state, for example, by requesting to run in the application landscape 400, by stopping to run in the application landscape 400, and/or by noting a failure during processing in the application landscape 400. The application landscape 400 may comprise one or more applications and/or other components 421, 422, 423, 424, 425, 426, 427, 428, 429 which may interact to process the business scenario 432.

As show in FIG. 6C, a business process 432-3 of the business scenario 432 currently running in the application landscape 400 is controlled by the central control mechanism 300 by sending a request to run 380 and by waiting for a confirmation to run 390 from the central control mechanism 300. Exchange of said control messages 380 and 390 between the central control mechanism 300 and a business process 432-3 in the application landscape is described above with reference to FIGS. 3 and 4. How the business scenario 432 itself is activated and deactivated in the application landscape 400 is described above with reference to FIG. 5.

Figure 7A:
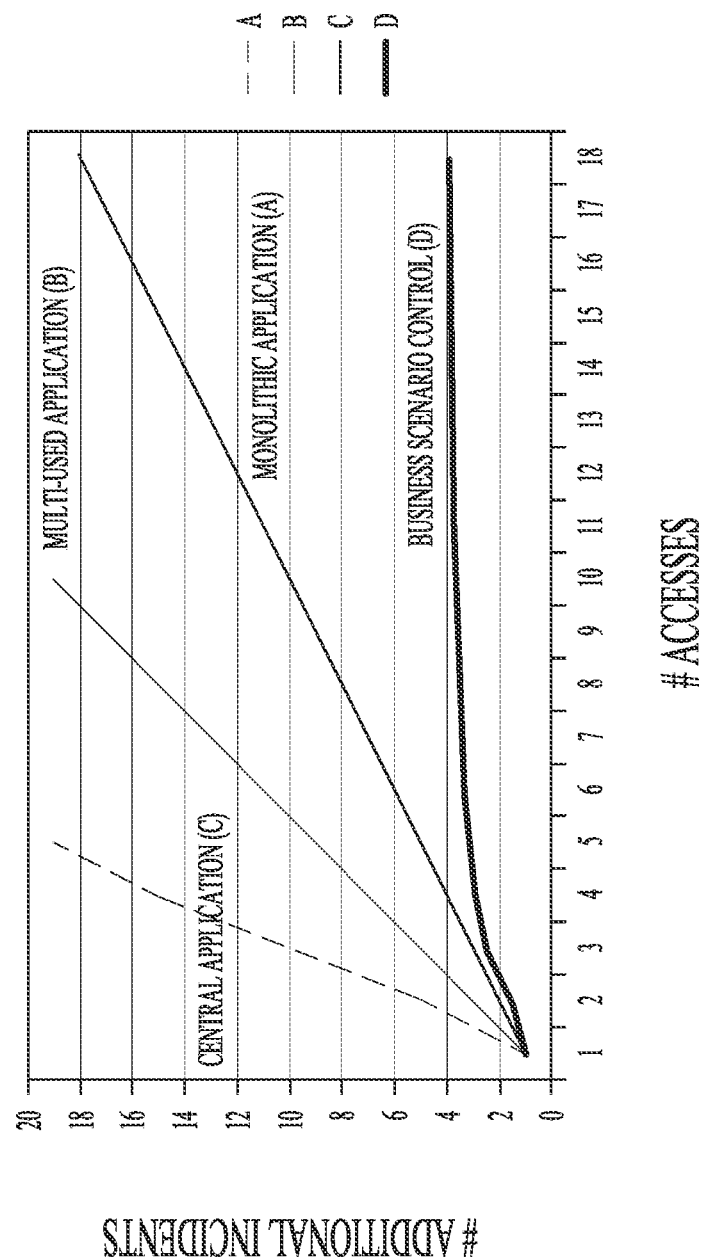
FIGS. 7A to 7C show efficiency improvements gained by implementing a central control unit for an application landscape.
Figure 7B:
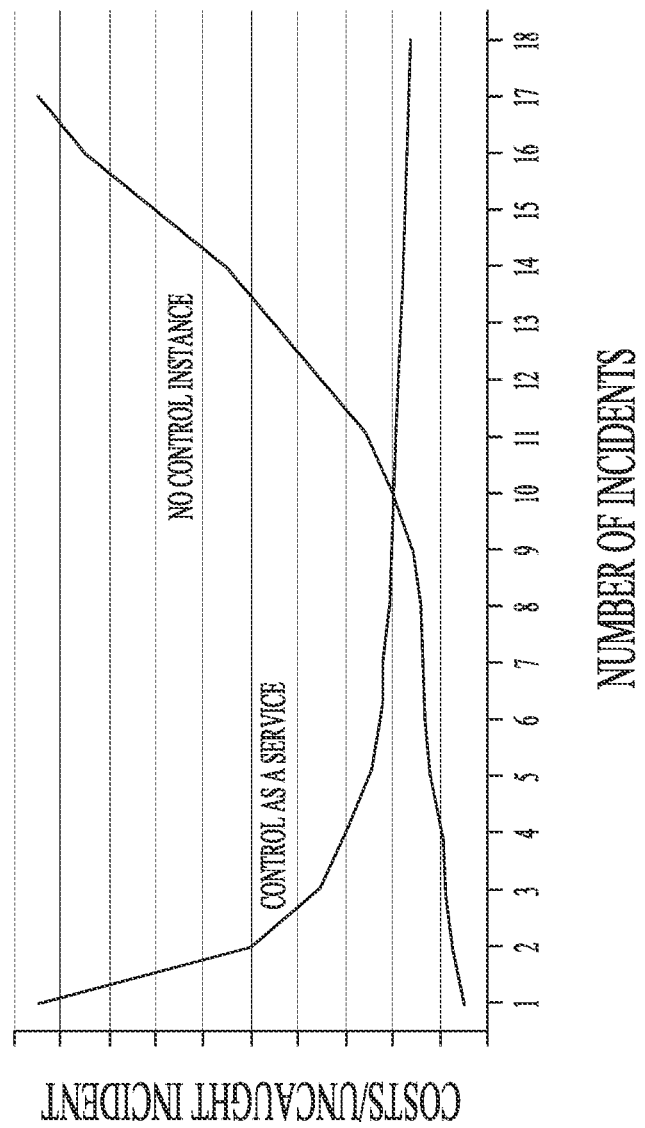
Figure 7C:
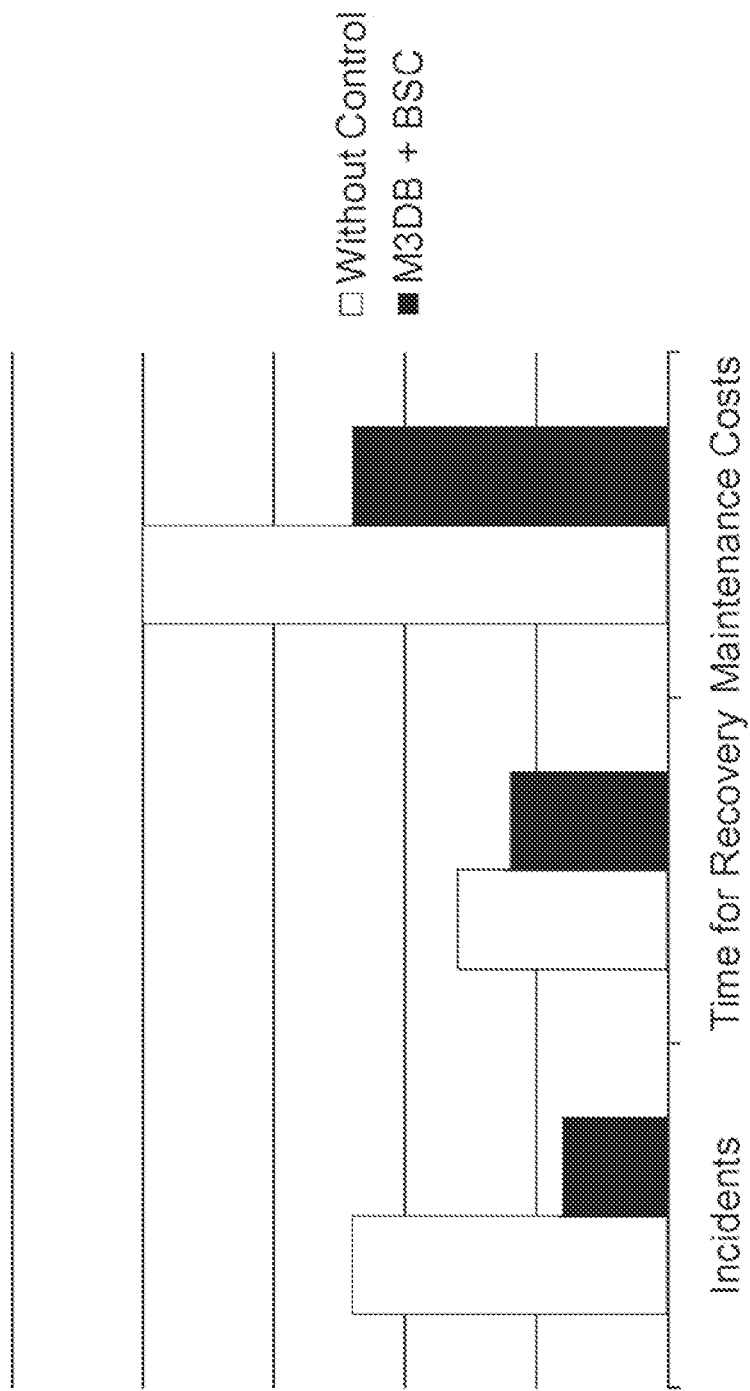

FIGS. 7A to 7C shown efficiency improvements gained by implementing a central control unit (e.g. MCI 100) comprising a central control mechanism (e.g. BSC 300) including an activation mechanism and coupled to a repository and/or a knowledge base (e.g. M3DB 200). For efficiency improvements achieved by a central control unit comprising a central control mechanism, in turn, comprising an activation mechanism and coupled to a repository and/or a knowledge base, the impact of a single component incident on a whole application landscape is considered.

Four different scenarios A, B, C, and D are shown in FIG. 7A. In the first scenario A it is assumed that a monolithic used component of an application landscape is failed and that other applications or business scenarios are not impaired. Then, in the scenario A, each access to the failed component results in one additional uncaught incident.

In case said component is used by other business scenarios then the other business scenarios fail too. As shown in scenario B for this case, more than one additional uncaught incident becomes likely.

In case, that a central component of the application landscape fails then exponentially more incidents will occur, failing and impairing several other business scenarios as shown in scenario C.

Scenario D describes, contrary to scenarios A to C, an application landscape under the control of a central control unit comprising a central control mechanism which comprises an activation mechanism and coupled to a repository and/or a knowledge base. As can be seen from the depicted graph for scenario D, after the incident is known, further accesses to the component are refused. The central control mechanism provides, if available, alternative processing paths for business scenarios and/or stops other business scenarios until the incident is solved.

For comparing the costs of a controlled approach to control business scenarios in application landscapes implementing the above described system and methods, different aspects are taken into account comprising time to repair, efforts for implementation, and/or reliability and maintainability. Regarding repair time and costs it is obvious that the controlled approach (as described above with reference to FIGS. 3 to 5) comprises a significant advantage in comparison with application landscapes without control above a certain number of incidents. If the number of incidents is low, then costs are above-average. But costs decrease logarithmically with the number of incidents or size of the application landscape as shown in FIG. 7B. The controlled approach (implemented by control as a service) is therefore indispensable for large and complex application landscapes to keep the (maintenance) costs for repair of uncaught incidents low.

Whenever alternative processing paths are provided by the controlled approach, then the availability of business scenarios will increase for an end-user and/or for a service provider. Further damage in the application landscape may be avoided and thus the reliability can be increased. Furthermore, by decreasing the overall downtime by speeding up maintenance scenarios, like repair time, then an overall availability and the reliability of application landscape functionalities can be increased. Availability may directly depend on the maintainability and/or may indirectly depend on the reliability of software or hardware components of an application landscape. The more controllable and maintainable an application landscape is, the higher its availability and reliability. This can be achieved by the controlled approach implementing a central control unit comprising a central control mechanism including an activation mechanism and coupled to a repository and/or a knowledge base as described with reference to the foregoing figures.

FIG. 7C shows the expected saving of incidents time for recovery and/or maintenance costs in an application landscape without a control mechanism (white bar) and with a controlled approach as described with reference to the forgoing figures (black bar).

Figure 8:
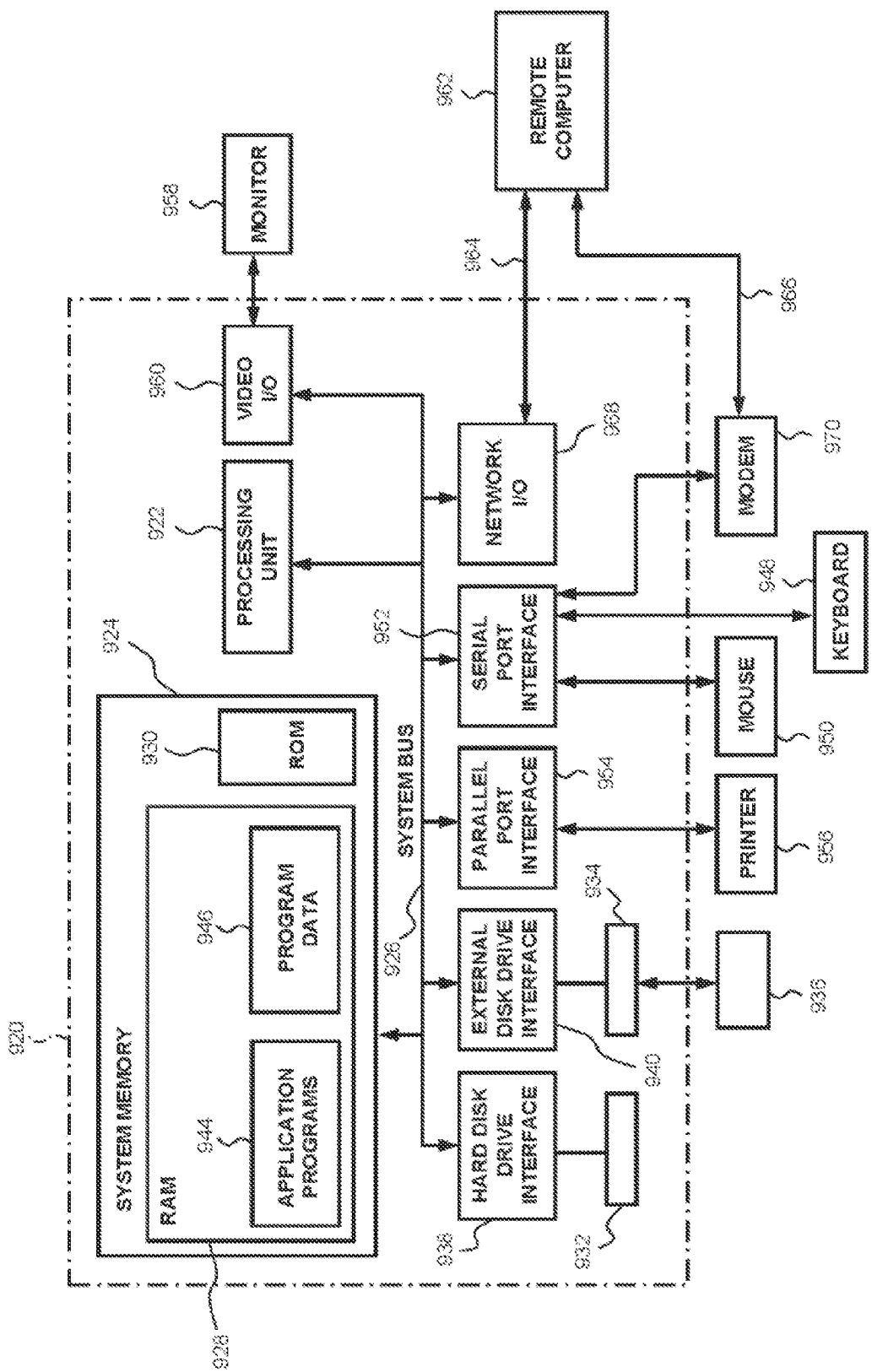
FIG. 8 shows an exemplary computer system and/or computer network system for implementing a computer network, a computer system, and a computer-implemented method as shown in FIGS. 1 to 6.

FIG. 8 shows an exemplary system for implementing some embodiments including a general purpose computing device in the form of a conventional computing environment 920 (e.g. a personal computer). The conventional computing environment includes a processing unit 922, a system memory 924, and a system bus 926. The system bus couples various system components including the system memory 924 to the processing unit 922. The processing unit 922 may perform arithmetic, logic and/or control operations by accessing the system memory 924. The system memory 924 may store information and/or instructions for use in combination with the processing unit 922. The system memory 924 may include volatile and nonvolatile memory, such as a random access memory (RAM) 928 and a read only memory (ROM) 930. A basic input/output system (BIOS) containing the basic routines that helps to transfer information between elements within the personal computer 920, such as during start-up, may be stored in the ROM 930. The system bus 926 may be any of several types of bus structures including a memory bus or memory controller, a peripheral bus, and a local bus using any of a variety of bus architectures.

The personal computer 920 may further include a hard disk drive 932 for reading from and writing to a hard disk (not shown), and an external disk drive 934 for reading from or writing to a removable disk 936. The removable disk may be a magnetic disk for a magnetic disk driver or an optical disk such as a CD ROM for an optical disk drive. The hard disk drive 932 and the external disk drive 934 are connected to the system bus 926 by a hard disk drive interface 938 and an external disk drive interface 940, respectively. The drives and their associated computer-readable media provide nonvolatile storage of computer readable instructions, data structures, program modules and other data for the personal computer 920. The data structures may include relevant data for the implementation of the method for control of application landscapes, as described above. The relevant data may be organized in a database, for example a relational database management system or a object-oriented database management system.

Although the exemplary environment described herein employs a hard disk (not shown) and an external disk 936, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 936, ROM 930 or RAM 928, including an operating system (not shown), one or more application programs 944, other program modules (not shown), and program data 946. The application programs may include at least a part of the functionality as depicted in FIGS. 1 to 6.

A user may enter commands and information, as discussed below, into the personal computer 920 through input devices such as keyboard 948 and mouse 950. Other input devices (not shown) may include a microphone (or other sensors), joystick, game pad, scanner, or the like. These and other input devices may be connected to the processing unit 922 through a serial port interface 952 that is coupled to the system bus 926, or may be collected by other interfaces, such as a parallel port interface 954, game port or a universal serial bus (USB). Further, information may be printed using printer 956. The printer 956 and other parallel input/output devices may be connected to the processing unit 922 through parallel port interface 954. A monitor 958 or other type of display device is also connected to the system bus 926 via an interface, such as a video input/output 960. In addition to the monitor, computing environment 920 may include other peripheral output devices (not shown), such as speakers or other audible output.

The computing environment 920 may communicate with other electronic devices such as a computer, telephone (wired or wireless), personal digital assistant, television, or the like. To communicate, the computer environment 920 may operate in a networked environment using connections to one or more electronic devices. FIG. 8 depicts the computer environment networked with remote computer 962. The remote computer 962 may be another computing environment such as a server, a router, a network PC, a peer device or other common network node, and may include many or all of the elements described above relative to the computing environment 920. The logical connections depicted in FIG. 8 include a local area network (LAN) 964 and a wide area network (WAN) 966. Such networking environments are commonplace in offices, enterprise-wide computer networks, intranets and the Internet and may particularly be encrypted.

When used in a LAN networking environment, the computing environment 920 may be connected to the LAN 964 through a network I/O 968. When used in a WAN networking environment, the computing environment 920 may include a modem 970 or other means for establishing communications over the WAN 966. The modem 970, which may be internal or external to computing environment 920, is connected to the system bus 926 via the serial port interface 952. In a networked environment, program modules depicted relative to the computing environment 920, or portions thereof, may be stored in a remote memory storage device resident on or accessible to remote computer 962. Furthermore other data relevant to the method for optimization of evaluation of a policy (described above) may be resident on or accessible via the remote computer 962. It will be appreciated that the network connections shown are exemplary and other means of establishing a communications link between the electronic devices may be used.

The above-described computing system is only one example of the type of computing system that may be used to implement the method for controlling application landscapes.

LIST OF REFERENCE NUMERALS 10 application landscape
11-18 component
11 enterprise resource planning system (ERP)
12 business intelligence (BI) component
13, 14 third party
15 supply chain management (SCM) component
16 supplier relationship management (SRM) component
17, 18 proprietary service
100 central control unit (e.g. MCI)
110 API
120 communication interface
130 agent
200 repository (e.g. M3DB)
210 directory of business scenarios
220 table of history information
230 table of business scenario activities
240 virtual landscape image
250 API of the M3DB
260 maintenance scenarios
270 landscape management tasks
300 central control mechanism (e.g. BSC)
310 receiving request process
320 evaluate process
330 decision process
331 run information
332 repository information
333 rule information
334 code information
335 additional information
336 accounting
340 run control process
350 activation mechanism
352, 354, 356, 358 processing steps of an activation mechanism/check in procedure
360 communication interface to a repository
370 process communication
380 request to run
380-1 request to run
380-2 request to run
390 confirmation to run
400 application landscape
410 hardware layer
420 application layer
421, 422, 423, 424, 425, 426, 427, 428, 429 components
430 business scenarios
432-1, 432-2, 432-3, 432-4, 432-5, 434-1, 434-2, 434-3, 436-1, 436-2, 438-1, 438-2 business processes
432, 434, 436, 438 business scenarios
500 run control commands
920 conventional computing environment
922 processing unit
924 system memory
926 system bus
928 random access memory (RAM)
930 read only memory (ROM)
932 hard disk drive
934 external disk drive
936 removable disk
938 hard disk drive interface
940 external disk drive interface
944 one or more application programs
946 program data
948 keyboard
950 mouse
952 serial port interface
954 parallel port interface
956 printer
958 monitor
960 video input/output
962 remote computer
964 local area network (LAN)
966 wide area network (WAN)
968 network I/O
970 a modem

The invention claimed is:

1. A computer network, comprising:
an application landscape comprising a plurality of at least one of software and hardware components and at least one sequence of processes which can run in the application landscape; and
a central control unit comprising a central control mechanism and a repository, wherein the central control unit is operable executable by at least one processor to control the application landscape and the repository includes at least one memory device, and wherein the central control mechanism comprises an activation mechanism stored on the at least memory device as instructions executable by the at least one processor operable to:
check in the sequence of processes for activation in the application landscape, comprising:
requesting from the repository a specification of the sequence of processes;
distributing the sequence of processes in the application landscape based on the specification;
activating at least one process comprised in the sequence of processes in the application landscape;
up confirmation of activation of each of the at least one processes, taking over control of the at least one process of the activated sequence of processes in the application landscape; and
wherein checking in the sequence of processes for activation in the application landscape protects processes of the sequence of process against access by other sequences of processes thereby locking the processes of the sequence of processes in a known state; and
check out the sequence of processes by deleting the specification of the sequence of processes from the repository when the sequence of processes is no longer in use in the application landscape.

2. The computer network of claim 1, wherein the activation mechanism is further operable to check in the sequence of processes into the application landscape by:
associating a unique identifier (unique ID) to the specification of the sequence of processes in the repository.

3. The computer network of claim 1, wherein the activation mechanism is further operable to check in the sequence of processes into the application landscape by:
requesting additional information about the sequence of processes comprising requesting at least one recovery procedure and a run-state of the at least one process; and
storing the additional information in the repository in association with the sequence of processes.

4. The computer network of claim 1, wherein distributing the sequence of processes in the application landscape comprises:
  distributing the sequence of processes in the application landscape by using a schema definition which defines the specification of the sequence of processes.

5. The computer network of claim 4, wherein the specification of the sequence of processes and the schema definition are defined in XML.

6. The computer network of claim 1, wherein the activation mechanism is further operable to:
  account the sequence of processes by determining at least one of time consumed and resources requested by the sequence of processes in the application landscape during processing.

7. A computer system for controlling an application landscape, the system comprising:
  at least one processor;
  at least one memory;
  an activation mechanism, wherein the activation mechanism is stored as executable instructions in the at least one memory operable through execution of the instructions on the at least one processor to:
    check in the sequence of processes for activation in the application landscape, comprising:
      requesting from a repository a specification of the sequence of processes;
      distributing the sequence of processes in the application landscape based on the specification;
      activating at least one process comprised in the sequence of processes in the application landscape;
      upon confirmation of activation of each of the at least one processes, taking over control of the at least one process of the activated sequence of processes in the application landscape; and
        wherein checking in the sequence of processes for activation in the application landscape protects processes of the sequence of process against access by other sequences of processes thereby locking the processes of the sequence of processes in a known state; and
    check out the sequence of processes by deleting the specification of the sequence of processes from the repository when the sequence of processes is no longer in use in the application landscape.

8. The computer system of claim 7, wherein the activation mechanism is further operable to check in the sequence of processes into the application landscape by:
  associating a unique identifier (unique ID) to the specification of the sequence of processes in the repository.

9. The computer system of claim 7, wherein the activation mechanism is further operable to check in the sequence of processes into the application landscape by:
  requesting additional information about the sequence of processes comprising requesting at least one recovery procedure and a run-state of the at least one process; and
  storing the additional information in the repository in association with the sequence of processes.

10. The computer system of claim 7, wherein distributing the sequence of processes in the application landscape comprises:
  distributing the sequence of processes in the application landscape by using a schema definition which defines the specification of the sequence of processes.

11. The computer system of claim 10, wherein the specification of the sequence of processes and the schema definition are defined in XML.

12. The computer system of claim 7, wherein the activation mechanism is further operable to:
  account the sequence of processes by determining at least one of time consumed and resources requested by the sequence of processes in the application landscape during processing.

13. A computer-implemented method for controlling an application landscape, the method comprising:
  checking in the sequence of processes for activation in the application landscape, comprising:
    requesting from a repository a specification of the sequence of processes;
    distributing the sequence of processes in the application landscape based on the specification;
    activating at least one process comprised in the sequence of processes in the application landscape;
    upon confirmation of activation of each of the at least one processes, taking over control of the at least one process of the activated sequence of processes in the application landscape; and
      wherein checking in the sequence of processes for activation in the application landscape protects processes of the sequence of process against access by other sequences of processes thereby locking the processes of the sequence of processes in a known state; and
  checking out the sequence of processes by deleting the specification of the sequence of processes from the repository when the sequence of processes is no longer in use in the application landscape.

14. The computer-implemented method of claim 13, wherein checking in the sequence of processes into the application landscape further comprises:
  associating a unique identifier (unique ID) to the specification of the sequence of processes in the repository.

15. The computer-implemented method of claim 14, wherein checking in the sequence of processes into the application landscape further comprises:
  requesting additional information about the sequence of processes comprising requesting at least one recovery procedure and a run-state of the at least one process; and
  storing the additional information in the repository in association with the sequence of processes.

16. The computer-implemented method of claim 13, wherein distributing the sequence of processes in the application landscape comprises:
  distributing the sequence of processes in the application landscape by using a schema definition which defines the specification of the sequence of processes.

17. The computer-implemented method of claim 16, wherein the specification of the sequence of processes and the schema definition are defined in XML.

18. The computer-implemented method of claim 13, further comprising:
  accounting the sequence of processes by determining at least one of time consumed and resources requested by the sequence of processes in the application landscape during processing.

19. The computer-implemented method of claim 13, wherein for all sequences of processes which are intended to run in the application landscape a corresponding predefined specification is stored in the repository.

20. A computer program product comprising computer readable instructions stored in memory, which when loaded and executed by a processor in at least one of a computer system and computer network system, causes at least one of the computer system and the computer network system to perform operations of the computer-implemented method of claim 13.

\* \* \* \* \*